United States Patent
Dai et al.

(10) Patent No.: US 12,550,111 B2
(45) Date of Patent: Feb. 10, 2026

(54) TIME-DRIFT ERROR MITIGATION FOR ROUND-TRIP-TIME POSITIONING

(71) Applicant: QUALCOMM Incorporated, San Diego, CA (US)

(72) Inventors: Jing Dai, Beijing (CN); Alexandros Manolakos, Escondido, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/261,772

(22) PCT Filed: Apr. 1, 2021

(86) PCT No.: PCT/CN2021/084895
§ 371 (c)(1),
(2) Date: Jul. 17, 2023

(87) PCT Pub. No.: WO2022/205299
PCT Pub. Date: Oct. 6, 2022

(65) Prior Publication Data
US 2024/0057026 A1    Feb. 15, 2024

(51) Int. Cl.
*H04W 64/00*  (2009.01)
*H04L 5/00*  (2006.01)

(52) U.S. Cl.
CPC ......... *H04W 64/006* (2013.01); *H04L 5/0051* (2013.01)

(58) Field of Classification Search
CPC ... H04W 64/00; H04W 64/006; H04W 24/08; H04W 56/0015; H04W 56/0045;
(Continued)

(56) References Cited

U.S. PATENT DOCUMENTS

| | | | |
|---|---|---|---|
| 9,973,951 | B1 | 5/2018 | Rai et al. |
| 10,855,421 | B2 | 12/2020 | Manolakos et al. |

(Continued)

FOREIGN PATENT DOCUMENTS

| | | |
|---|---|---|
| WO | 2019032733 | 2/2019 |
| WO | 2020107155 A1 | 6/2020 |

(Continued)

OTHER PUBLICATIONS

Huawei, et al., "Remaining Issues on SRS Configuration," 3GPP TSG-RAN WG2 eMeeting #109, R2-2000967, Electronic, Feb. 24-Mar. 6, 2020, (Mar. 6, 2020), 4 pages, the whole document.

(Continued)

*Primary Examiner* — Siu M Lee
(74) *Attorney, Agent, or Firm* — QUALCOMM Incorporated

(57) ABSTRACT

Disclosed are systems, apparatuses, methods, and non-transitory media for improving user equipment (UE) positioning by reducing round-trip-time (RTT) measurement errors that may result from clock-drift between network nodes. In some aspects, RTT measurement error can be mitigated through modifications to resource signaling schedules at a UE and/or gNB, for example, based on resource configuration information specifying a time-gap for signaling resource transmission.

29 Claims, 13 Drawing Sheets

(58) Field of Classification Search
CPC ....... G01S 7/40; G01S 13/765; H04L 5/0048; H04L 5/0051; H04L 5/0094; H04L 5/0078

See application file for complete search history.

(56) References Cited

U.S. PATENT DOCUMENTS

| | | | |
|---|---|---|---|
| 2012/0106489 A1* | 5/2012 | Konishi | H04W 72/51 370/329 |
| 2016/0150572 A1 | 5/2016 | Quan et al. | |
| 2019/0049550 A1 | 2/2019 | Modarres Razavi et al. | |
| 2019/0268725 A1 | 8/2019 | Edge et al. | |
| 2021/0144658 A1* | 5/2021 | Han | H04W 36/0069 |
| 2021/0273710 A1 | 9/2021 | Song et al. | |
| 2021/0377904 A1* | 12/2021 | Huang | H04W 56/006 |
| 2022/0029764 A1* | 1/2022 | Liou | H04L 5/0094 |
| 2022/0345903 A1* | 10/2022 | Liu | H04W 16/28 |
| 2023/0048976 A1* | 2/2023 | Li | H04L 5/0035 |
| 2023/0198707 A1* | 6/2023 | Yokomakura | H04L 5/0051 370/329 |
| 2023/0370231 A1* | 11/2023 | Abdelghaffar | H04L 5/0051 |

FOREIGN PATENT DOCUMENTS

| | | |
|---|---|---|
| WO | 2020164334 A1 | 8/2020 |
| WO | 2020167857 A1 | 8/2020 |
| WO | 2020206021 A1 | 10/2020 |

OTHER PUBLICATIONS

International Search Report and Written Opinion—PCT/CN2021/084895—ISA/EPO—Jan. 4, 2022.
Supplementary European Search Report—EP21933958—Search Authority—The Hague—Mar. 5, 2025.
Qualcomm Incorporated: "On UE Rx-Tx Timing Difference Measurements in NR Positioning", R4-2009876, 3rd Generation Partnership Project, Mobile Competence Centre, 650, Route Des Lucioles, F-06921 Sophia-Antipolis Cedex, France, vol. RAN WG4, No. Online; Aug. 17, 2020-Aug. 28, 2020, Aug. 7, 2020, 7 Pages, XP052414338, Section 3.
Supplementary European Search Report—EP21933958—Search Authority—The Hague—Dec. 10, 2024.
VIVO: "Discussion on UE Rx-Tx Time Difference Measurement Requirements", R4-2101777, 3rd Generation Partnership Project, Mobile Competence Centre, 650, Route Des Lucioles, F-06921 Sophia-Antipolis Cedex, France, vol. RAN WG4, No. Electronic Meeting, Jan. 25, 2020-Feb. 5, 2020, Jan. 15, 2021, 5 Pages, XP052180234, Section 2.

* cited by examiner

TIME-DRIFT ERROR MITIGATION FOR ROUND-TRIP-TIME POSITIONING

FIELD

Aspects of the disclosure relate generally to wireless positioning and the like. In some aspects, examples are described for improving round-trip-time (RTT) positioning by minimizing clock-drift error.

BACKGROUND

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users with, for example, a gigabit connection speeds to tens of users in a common location, such as on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for reducing round-trip-time (RTT) measurement errors caused by clock-drift between network nodes, such as a UE device and a base station (e.g., gNB). According to at least one example, an apparatus for facilitating RTT positioning is provided, the apparatus including at least one transceiver, at least one memory, and at least one processor coupled to the at least one transceiver and the at least one memory and configured to: obtain a threshold associated with a user equipment (UE) device; determine, based on the threshold, resource configuration information for the UE device, the resource configuration information indicating a time-gap between Sounding Reference Signal (SRS) resources associated with the UE device; and transmit, via the at least one transceiver, the resource configuration information to the UE device.

In another example, a computer-implemented method is provided for facilitating RTT positioning, e.g., to improve position estimation accuracy for a UE device. The computer-implemented method can include: obtaining a threshold associated with a user equipment (UE) device; determining, based on the threshold, resource configuration information for the UE device, the resource configuration information indicating a time-gap between Sounding Reference Signal (SRS) resources associated with the UE device; and transmitting the resource configuration information to the UE device.

In another example, an apparatus for facilitating round trip time (RTT) positioning is provided. The apparatus can include: means for obtaining a threshold associated with a user equipment (UE) device; means for determining, based on the threshold, resource configuration information for the UE device, the resource configuration information indicating a time-gap between Sounding Reference Signal (SRS) resources associated with the UE device; and means for transmitting the resource configuration information to the UE device.

In another example, a non-transitory computer-readable medium is provided, comprising at least one instruction for causing a computer or processor to: obtain a threshold associated with a user equipment (UE) device; determine, based on the threshold, resource configuration information for the UE device, the resource configuration information indicating a time-gap between Sounding Reference Signal (SRS) resources associated with the UE device; and transmit the resource configuration information to the UE device.

In another example, an apparatus for facilitating RTT positioning is provided. The apparatus can include: at least one transceiver; at least one memory; and at least one processor coupled to the at least one transceiver and the at least one memory and configured to: receive, via the at least one transceiver, resource configuration information, wherein the resource configuration information is based on a threshold corresponding to the apparatus, and wherein the resource configuration information indicates a time-gap for transmission of Sounding Reference Signal (SRS) resources; and transmit, via the at least one transceiver, one or more SRS resources based on the time-gap indicated by the resource configuration information.

In another example, a computer-implemented method for facilitating RTT positioning is provided. The computer-implemented method can include: receiving, by a user equipment (UE) device, resource configuration information, wherein the resource configuration information is based on a threshold corresponding to the UE device, and wherein the resource configuration information indicates a time-gap for transmission of Sounding Reference Signal (SRS) resources; and transmitting, by the UE device, one or more SRS resources based on the time-gap indicated by the resource configuration information.

In another example, an apparatus is provided for facilitating RTT positioning. The apparatus can include: means for receiving resource configuration information, wherein the resource configuration information is based on a threshold corresponding to the UE device, and wherein the resource configuration information indicates a time-gap for transmission of Sounding Reference Signal (SRS) resources; and means for transmitting one or more SRS resources based on the time-gap indicated by the resource configuration information.

In another example, a non-transitory computer-readable medium of a user equipment (UE) device is provided, comprising at least one instruction for causing a computer or processor to: receive resource configuration information, wherein the resource configuration information is based on a threshold corresponding to the UE device, and wherein the resource configuration information indicates a time-gap for transmission of Sounding Reference Signal (SRS) resources; and transmit one or more SRS resources based on the time-gap indicated by the resource configuration information.

In another example, an apparatus for facilitating round trip time (RTT) positioning is provided. The apparatus can include at least one transceiver; at least one memory; and at least one processor coupled to the at least one transceiver and the at least one memory and configured to: receive, via the at least one transceiver, capability information associated with a user equipment (UE) device; and transmit, via the at least one transceiver, a threshold associated with the UE device, wherein the threshold is based on the capability information.

In another example, a computer-implemented method for facilitating RTT positioning is provided. The computer-implemented method can include: receiving capability information associated with a user equipment (UE) device; and transmitting a threshold associated with the UE device, wherein the threshold is based on the capability information.

In another example, an apparatus for facilitating round trip time (RTT) positioning is provided. The apparatus can include means for receiving capability information associated with a user equipment (UE) device; and means for transmitting a threshold associated with the UE device, wherein the threshold is based on the capability information.

In another example, a non-transitory computer-readable medium is provided, comprising at least one instruction for causing a computer or processor to: receive, via the at least one transceiver, capability information associated with a user equipment (UE) device; and transmit, via the at least one transceiver, a threshold associated with the UE device, wherein the threshold is based on the capability information.

In some aspects, the apparatus is or is part of a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a vehicle, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
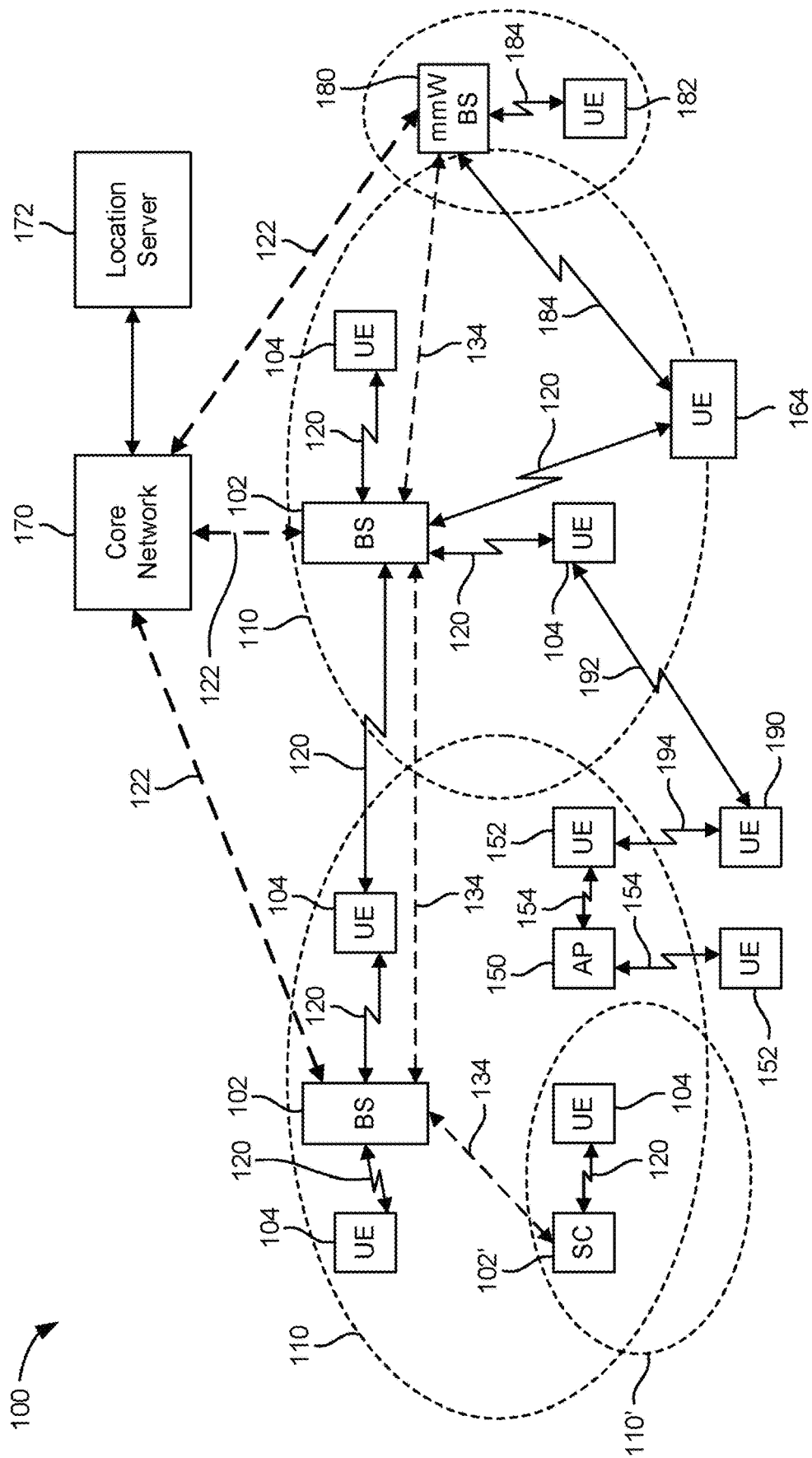
FIG. 1 is a diagram illustrating an example wireless communications system, in accordance with some aspects of the present disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein can be applied independently and some of them may be applied in combination as would be apparent to those of skill in the art.

In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Aspects of the present disclosure relate to features for improving mobile device, e.g., user equipment (UE), location estimation. As used herein, a location estimate may be referred to by other names, such as a position estimate, location, position, position fix, fix, or the like. A location estimate may be geodetic and may comprise coordinates (e.g., latitude, longitude, and possibly altitude) or may be civic and comprise a street address, postal address, or some other description of a location. A location estimate may further be defined relative to some other known location or defined in absolute terms (e.g., using latitude, longitude, and/or altitude). A location estimate may include an expected error or uncertainty (e.g., by including an area or volume within which the location is expected to be included with some specified or default level of confidence).

Systems, apparatuses, processes (also referred to as methods), and computer-readable media (collectively referred to herein as systems and techniques) are described herein for improved mobile device (e.g., UE or UE device) positioning that is achieved by reducing round-trip-time measurement errors resulting from clock-drift, for example, between a UE and a base station (e.g., a gNB). As described in further detail below, the systems and techniques can include the scheduling of reference signal transmission in a manner that is configured to reduce clock-drift error.

In some aspects, resource (e.g., SRS resource) transmission can be scheduled using resource configuration information, for example, that specifies a time-gap between Sounding Reference Signal (SRS) resources transmitted by a UE device. In some approaches, the time-gap can be configured to minimize measurement errors using an asynchronous reference signal exchange, e.g., between a UE and an associated gNB. In such implementations, the time-gap can be configured to meet or exceed a time duration that is based on a threshold associated with the UE device. In some approaches, the time-gap may be associated with signaling window information, for example, that specifies a time duration (or signaling window) in which resource set transmission can occur, following the specified time-gap.

As discussed in further detail below, the threshold can be determined based on a UE capability, a bandwidth of the UE, a bandwidth of one or more signaling resources associated with the UE, or a combination thereof. In some aspects, a location server (e.g., a location management function (LMF) can determine the threshold based on the UE capability, the bandwidth of the UE, the bandwidth of the one or more signaling resources associated with the UE, or any combination thereof.

In some approaches, the time-gap can be configured to minimize measurement errors using a synchronous reference signal exchange, e.g., between the UE and associated gNB. In such implementations, the time-gap between SRS resources transmitted by the UE can be periodic, and can minimize the effects of clock-drift on RTT measurements. In such approaches, the time-gap can be used to specify SRS resource transmission periodicity at the UE. In some examples, depending on the desired implementation, the UE can be configured to transmit one or more pairs of SRS resources at regular (periodic) time intervals specified by the time-gap. In some examples, the UE can be configured to transmit a single SRS resource set, followed by a copy of the single SRS resource set that is transmitted after a time delay specified by the time-gap. The time-gap can be determined based on a threshold, similar to that described above. For example, the threshold can be determined (e.g., by a location server, such as an LMF) based on a UE capability, a bandwidth of the UE, a bandwidth of one or more signaling resources associated with the UE, or a combination thereof.

Additional aspects of the present disclosure are described in more detail below.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A base station may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) can include various base stations 102 and various UEs 104. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2A:
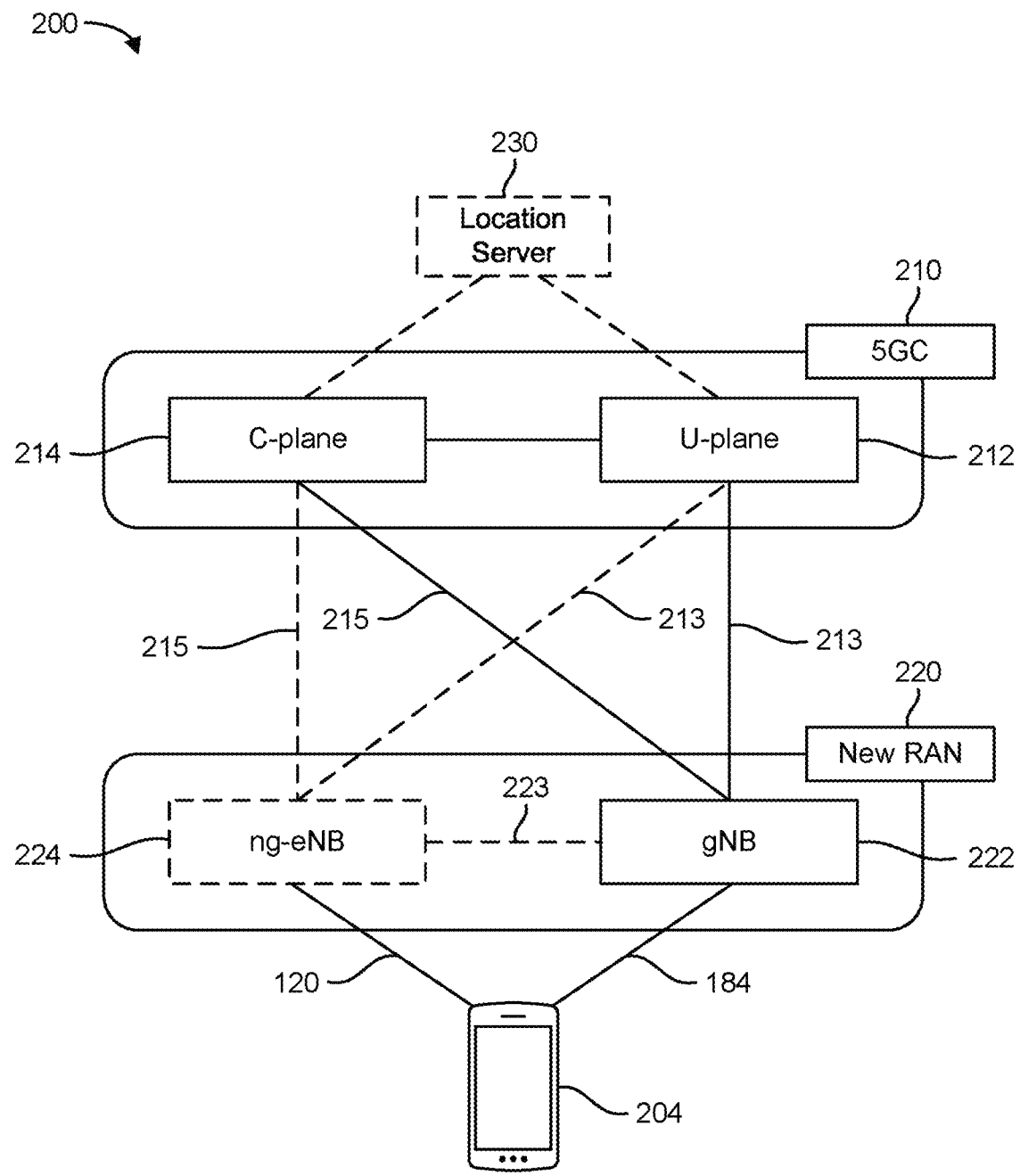
FIGS. 2A and 2B are diagrams illustrating example wireless network structures, in accordance with some aspects of the present disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated with a component of the core network, or alternatively may be external to the core network. In some examples, the location server 230 can be operated by a carrier or provider of the 5GC 210, a third party, an original equipment manufacturer (OEM), or other party. In some cases, multiple location servers can be provided, such as a location server for the carrier, a location server for an OEM of a particular device, and/or other location servers. In such cases, location assistance data can be received from the location server of the carrier and other assistance data can be received from the location server of the OEM.

Figure 2B:
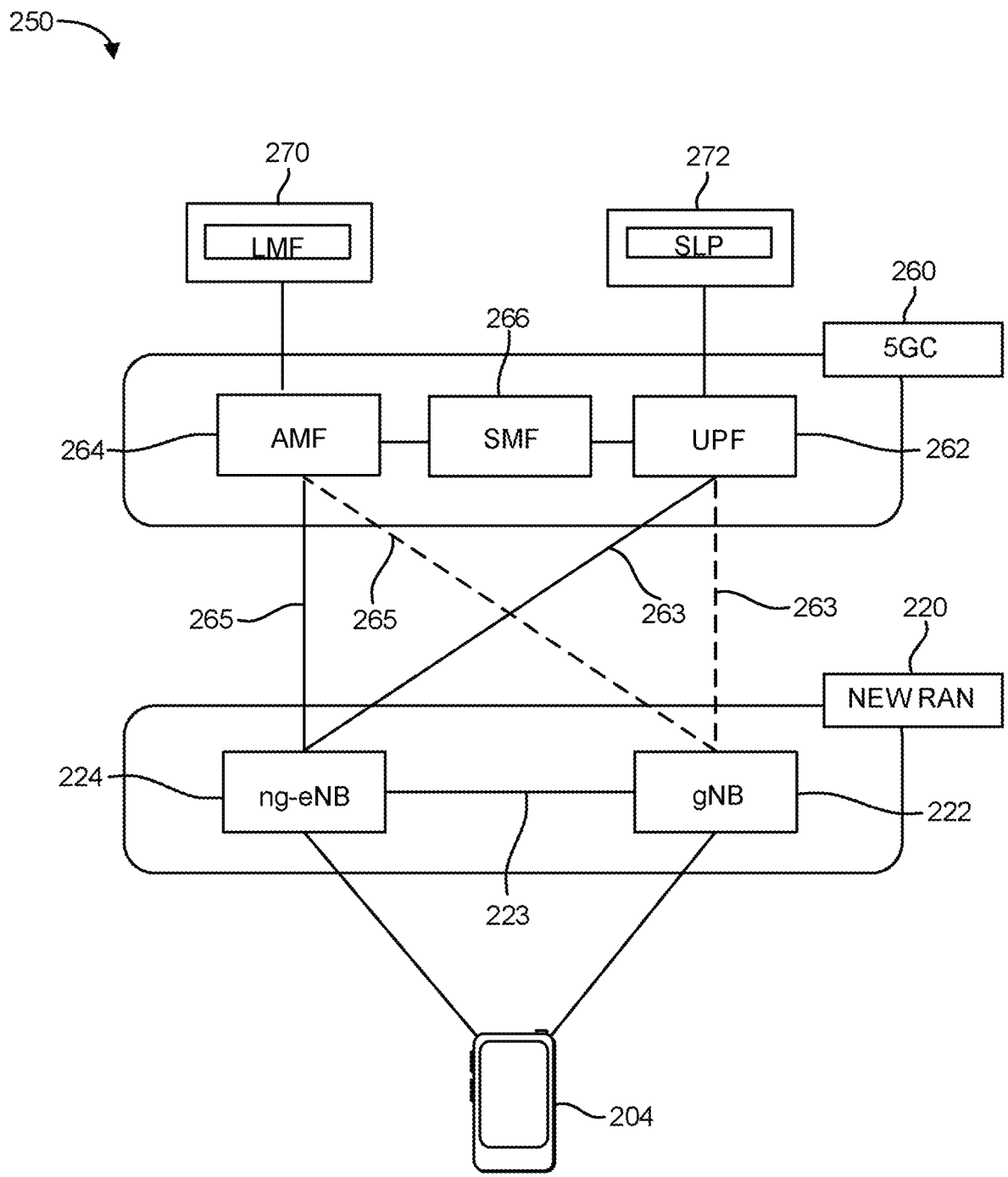

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and/or security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

In some aspects, location and positioning functions can be aided by a Location Management Function (LMF) 270 that is configured for communication with the 5GC 260, e.g., to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated with a base station, such as the gNB 222 and/or the ng-eNB 224. When integrated with the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

As discussed herein, NR supports a number of cellular network-based positioning technologies, including downlink-based, uplink-based, and downlink-and-uplink-based positioning methods. For example, the LMF 270 can enable positioning based on location measurements computed for various positioning signal (PRS or SRS) resources. As used herein, "PRS resource set" is a set of PRS resources used for the transmission of PRS signals, where each PRS resource has a PRS resource identifier (ID). In addition, the PRS resources in a PRS resource set are associated with the same TRP. A PRS resource set is identified by a PRS resource set ID and is associated with a particular TRP (e.g., identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^\mu \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

In some cases, a PRS resource ID in a PRS resource set is associated with a single beam (and/or beam ID) transmitted from a single TRP (where a TRP may transmit one or more beams). For example, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," "a positioning instance," a "positioning repetition," or simply an "occasion," an "instance," or a "repetition."

A "positioning frequency layer" (also referred to simply as a "frequency layer" or "layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb size. The Point A parameter takes the value of the parameter ARFCN-ValueNR (where "ARFCN" stands for "absolute radio-frequency channel number") and is an identifier and/or code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Downlink-based location measurements can include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., LMF 270) can estimate the UE's location. For DL-AoD positioning, a base station (gNB 222) measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT or multi RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

To assist positioning operations, a location server (e.g., location server 230, LMF 270, or other location server) may provide assistance data to the UE. For example, the assistance data may include identifiers of the base stations (or the cells and/or TRPs of the base stations) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

For DL-AoD, the UE 204 can provide DL-PRS beam Received Signal Received Power (RSRP) measurements to the LMF 270, whereas the gNB 222 can provide the beam azimuth and elevation angle information. When using an UL AoA positioning method, the position of UE 204 is estimated based on UL SRS AoA measurements taken at different TRPs (not illustrated). For example, TRPs can report AoA measurements directly to LMF 270. Using angle information (e.g., AoD or AoA) together TRP co-coordinate information and beam configuration details, the LMF 270 can estimate a location of UE 204.

For multi-RTT location measurements, the LMF 270 can initiate a procedure whereby multiple TRPs (not illustrated) and a UE perform the gNB Rx-Tx and UE Rx-Tx measurements, respectively. For example, the gNB 222 and UE 204 can transmit a downlink positioning reference signal (DL-PRS) and uplink sounding reference signal (UL-SRS), respectively, whereby the gNB 222 configures UL-SRS to the UE 204 e.g., using the radio resource control (RRC) protocol. In turn, the LMF 270 can provide the DL-PRS configuration to the UE 204. Resulting location measurements are reported to the LMF 270 by the UE 204 and/or gNB 222 to perform location estimation for the UE 204.

To improve the accuracy of UE location estimates, NR supports the combination of multiple different location measurement types. However, for RTT based measurements, measurement errors can result from differences in time synchronization (clock-drift), between various network nodes, such as between a UE (e.g., UE 204) and its corresponding base station(s) (e.g., gNB 222). Aspects of the present disclosure provide solutions for reducing or mitigating clock-drift error through the modification of resource transmission schedules. As discussed in further detail below, the present disclosure describes solutions for minimizing RTT measurement errors though the planned scheduling of resource transmission at the UE. Resource transmission schedules (e.g., SRS resource scheduling) can be communicated to the UE by a gNB and/or location server, using resource configuration information that specifies a predetermined time-gap to be applied to SRS resource transmissions at the UE.

In some approaches, the time-gap can be configured to minimize measurement errors using an asynchronous reference signal exchange, e.g., between a UE and an associated gNB. In other approaches, the time-gap can be configured to minimize measurement errors using a synchronous reference signal exchange, e.g., between the UE and associated gNB. Further discussion of the various approaches to mitigating RTT measurement error using asynchronous and synchronous schedules is provided in conjunction with FIGS. 3A and 3B.

Figure 3A:
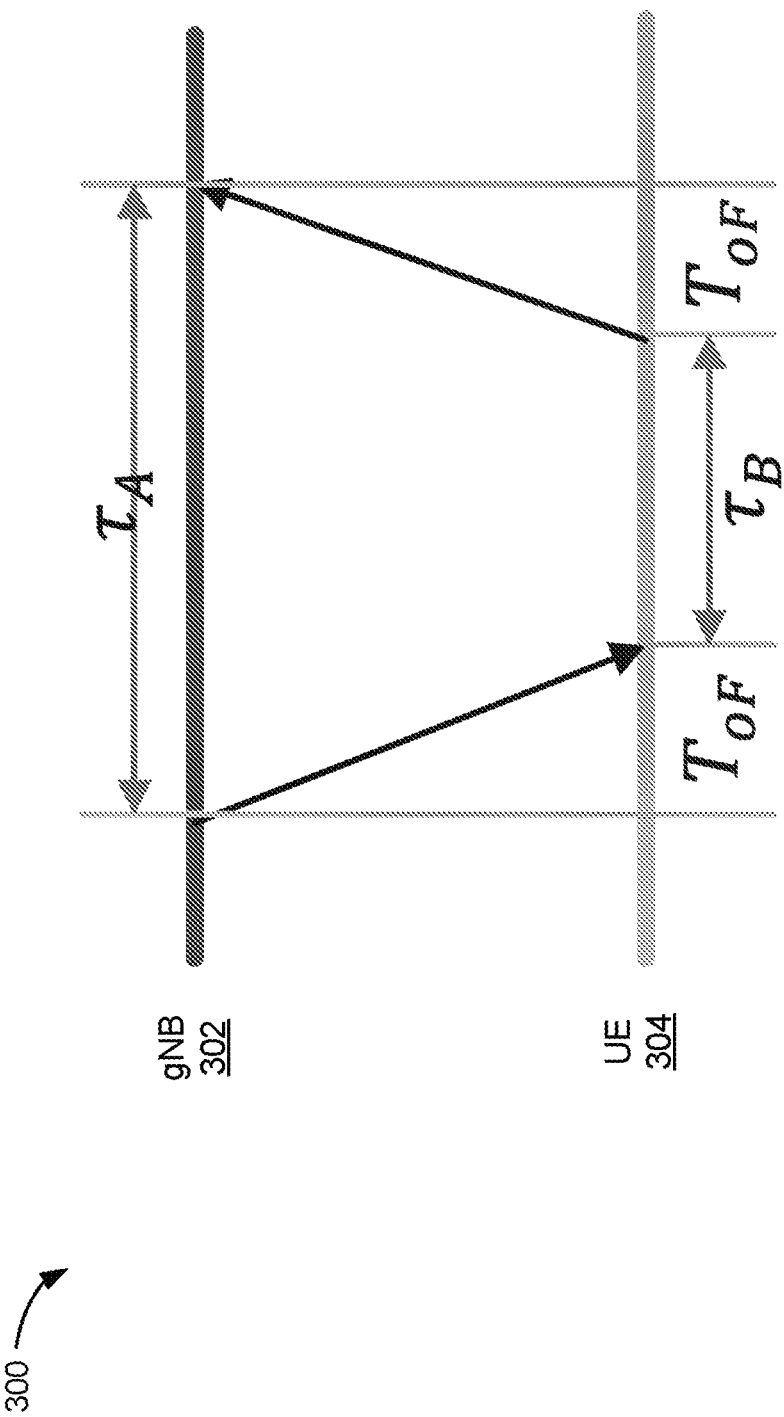
FIGS. 3A and 3B illustrate example communication diagrams indicating time-of-flight and Rx-Tx time differences between network nodes, such as a UE and a gNB, according to some aspects of the present disclosure.

FIG. 3A illustrates an example communication diagram 300 indicating time-of-flight and reception-to-transmission (Rx-Tx) differences between two network nodes, such as a gNB 302 and a UE 304. The example communication diagram 300 of FIG. 3A can be representative of sidelink round-trip time (RTT) and/or Uu RTT. In the example of FIG. 3A, time-of-flight ($T_{oF}$) contributions for receive-transmit (e.g., Rx-Tx) time differences are shown. In the illustrated example, a Tx-Rx time difference corresponding to gNB 302 is represented as $\tau_A$ and a Rx-Tx time difference for UE 304 is represented as $\tau_B$. Using positioning reference signals (PRS) and sounding reference signal (SRS) as an illustrative example of signals exchanged between the gNB 302 and the UE 304 for a single-round of PRS-SRS resource exchange, the round-trip-time (RTT) ($\tau_A$) is given by equation (1), in which:

$$\tau_A = 2T_{oF} + \tau_B \quad (1)$$

A clock drift between gNB 302 and UE 304, can be expressed by equations (2) and (3), respectively:

$$\hat{\tau}_A = (1+e_A)\tau_A = k_A\tau_A \quad (2)$$

$$\hat{\tau}_B = (1+e_B)\tau_B = k_B\tau_B \quad (3)$$

where $\tau_A$ and $\tau_B$ are measured Rx-Tx time differences, and $e_A$ or $e_B$ model a deviation from ideal time. In some aspects, $e_A$ and/or $e_B$ are represented in parts-per-million (ppm) or parts-per billion (ppb). In one illustrative example, such as for a 5G/NR UE, the required clock drift is up to ±0.1 ppm (±100 ppb). For estimated time-of-flight (ToF) using $$\hat{T}_{oF} = \frac{1}{2}(\hat{\tau}_A - \hat{\tau}_B),$$

an error due to clock-drift is given by, equation (4):

$$\hat{T}_{oF} - T_{oF} = e_A T_{oF} + \frac{\tau_B}{2}(e_A - e_B) \quad (4)$$

where $T_{oF}$ can be on the order of microseconds (for example, where 1 µs corresponds to a distance of 300 m), while $\tau_B$ can be on the order of milliseconds—thus, in this example, the term $$\frac{\tau_B}{2}(e_A - e_B)$$

is the dominant part of the estimation error. Assuming, for example, $\tau_B$=100 ms, whereby $e_A-e_B$ is ±0.2 ppm, the error can be 10 ns, or 3 meters in distance.

Figure 3B:
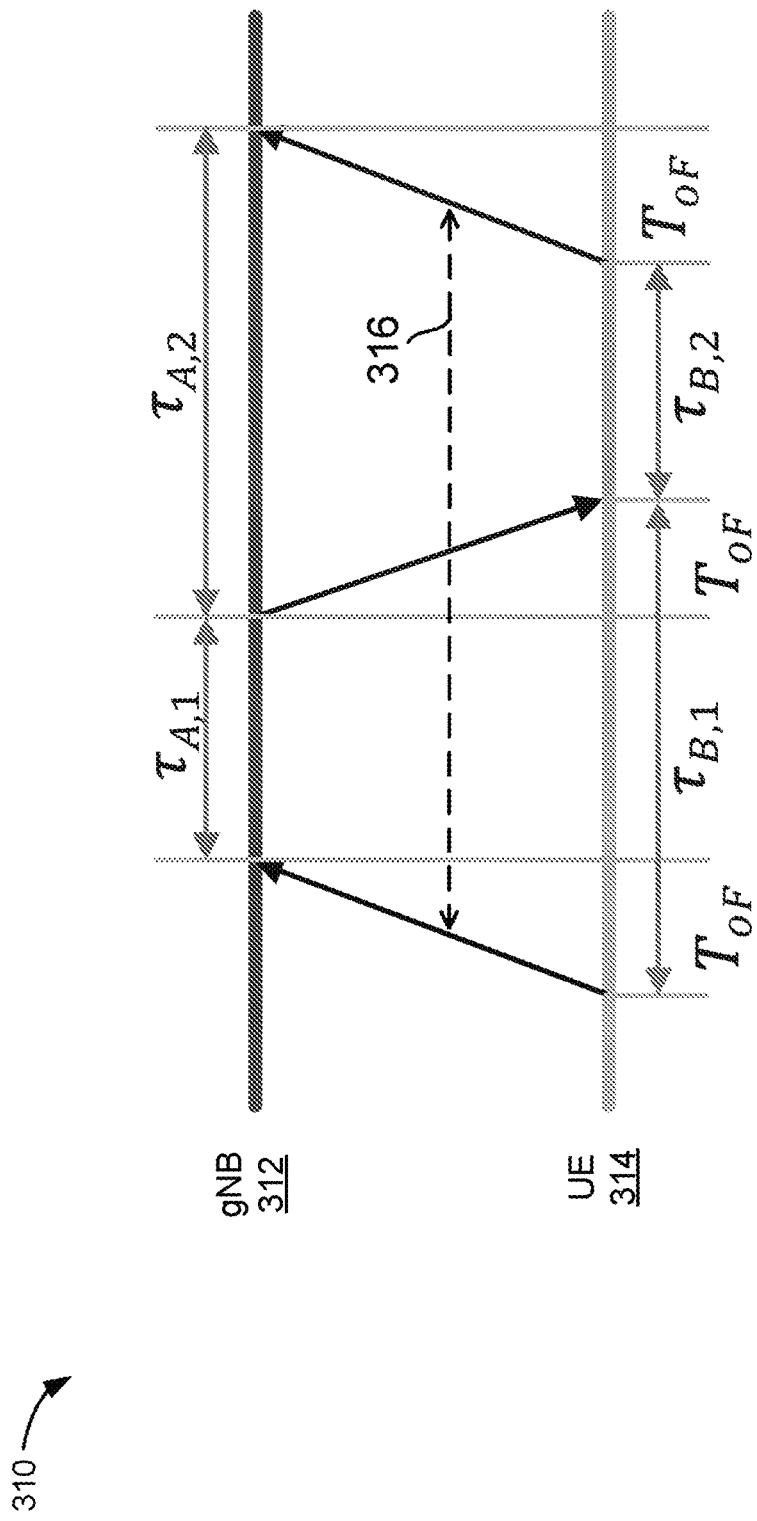

FIG. 3B illustrates an example signaling exchange 310 between two network nodes in which multiple resource sets are exchanged, for example, between a gNB 312 and a UE 314. As described herein, time drift errors can be mitigated or minimized by ensuring that Rx-Tx time-gaps are either substantially similar (e.g., periodic), or that they are configured to exceed a predetermined threshold duration (e.g., a drift-correction reference duration). Using the example of FIG. 3B, in the case where signaling exchange is synchronous or periodic (e.g., $\tau_{(B,1)}=\tau_{(A,2)}$), the time-of-flight measurement error for symmetric signaling exchange scenarios can be given by equation (5):

$$\hat{T}_{oF} - T_{oF} = \frac{1}{2}T_{oF}(e_A + e_B) + \frac{1}{4}(e_A - e_B)(\tau_{B,1} - \tau_{A,2}) \quad (5)$$

And the corresponding drift mitigation calculation can be given by equation (6):

$$\hat{T}_{oF\_MIT} = \frac{1}{4}(\hat{\tau}_{A,1} - \hat{\tau}_{B,1} + \hat{\tau}_{B,2} - \hat{\tau}_{A,2}) \quad (6)$$

In other aspects, clock-drift error can be mitigated by ensuring an adequate time period (e.g., a drift-correction reference duration 316) between SRS signaling sets. In such approaches, and as discussed in further detail below, the drift-correction reference duration may be configured to be greater than (or equal to) a predetermined time-gap or threshold. For example, in instances when Rx-Tx time-gaps are unequal a corresponding drift mitigation calculation is given by equation (7):

$$\hat{T}_{oF} = \frac{\hat{t}_{A,1}\hat{t}_{B,2} - \hat{t}_{A,2}\hat{t}_{B,1}}{2(\hat{t}_{B,1} + \hat{t}_{B,2})} = \frac{1}{2}\left[\hat{t}_{A,1} - \frac{\hat{t}_{A,1} + \hat{t}_{A,2}}{\hat{t}_{B,1} + \hat{t}_{B,2}}\hat{t}_{B,1}\right] \quad (7)$$

Accordingly, a time-of-flight error can be represented by the relationship of equation (8):

$$\hat{T}_{oF} - T_{oF} = e_A T_{oF} \quad (8)$$

Figure 4:
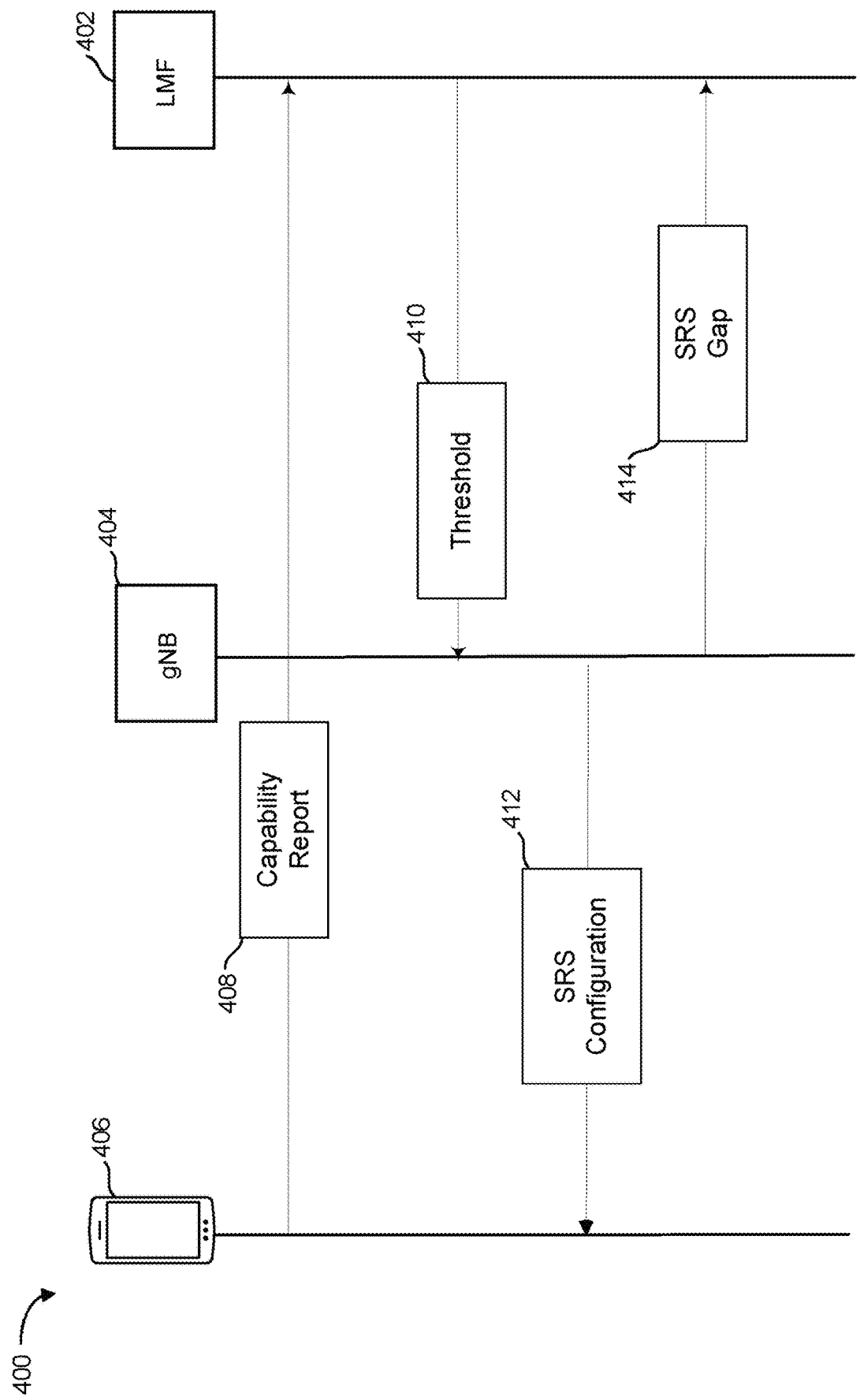
FIG. 4 illustrates an example timing diagram in which resource configuration information is provided to a mobile device, (e.g., a UE device), according to some aspects of the present disclosure.

FIG. 4 illustrates an example timing diagram 400 in which resource configuration information is provided to a mobile device (e.g., a UE device) according to some aspects of the present disclosure. In particular, timing diagram 400 illustrates an example communication scenario between various network nodes, such as a location server (e.g., LMF 402), a base station (e.g., gNB 404), and a mobile device (e.g., UE 406). As shown in FIG. 4, UE 406 can transmit capability information to LMF 402 via a capability report 408. Depending on the desired implementation, capability report 408 can include various types of information associated with the UE, resources the UE is configured to transmit, and/or other information. In one illustrative example, the capability report 408 can include but is not limited to an indication of bandwidth of the UE 406, an indication of a bandwidth of one or more resources (e.g., SRS resources) associated with the UE 406, or a combination thereof.

The LMF 402 can determine a threshold associated with the UE 406. For example, the LMF may identify the threshold associated with the UE by performing a lookup function using any of the information received in the capability report 408. Depending on the implementation, the threshold can be based on various attributes associated with the UE 406 that are communicated to the LMF 402 via the capability report 408. In some examples, the threshold can be based on a bandwidth of the UE 406, a bandwidth of the SRS resources associated with the UE 406, or a combination thereof. For instance, using the UE capability information communicated in the capability report 408 (e.g., the bandwidth of the UE 406, the bandwidth of the SRS resources associated with the UE 406, or a combination thereof), the LMF 402 can determine or identify the threshold associated with the UE 406. In some aspects, the threshold can correspond with a time-period and/or number of uplink time slots that is associated with the UE 406. By way of illustrative example, based on a first set of capability information for a first UE, the LMF may determine that the threshold is 200 msec, and based on a different set of capability information, such as a second set of capability information for a second UE, the LMF may determine that the threshold is 50 msec. As discussed in further detail below, the threshold may be used to determine a time-gap to be used by the UE 406 in communication of one or more SRS resources, for example, that is configured to minimize a RTT measurement error. In some aspects, the time-gap may be associated with signaling window information, for example, that specifies a signaling window in which one or more resource sets can be transmitted by the UE 406.

Once the threshold is determined by the LMF 402, the LMF 402 communicates the threshold 410 to gNB 404. The gNB 404 can use the threshold 410 to generate a resource scheduling configuration (or resource configuration) for the UE 406. In some examples, the resource configuration can specify a time-gap (e.g., a gap between SRS resources) to be applied between reference signal sets transmitted by the UE 406. In some aspects, the time-gap may be associated with signaling window information, for example, that specifies a signaling window in which one or more resource sets can be transmitted by the UE 406. The gNB 404 can determine the time-gap and/or the signaling window based on the threshold, as described below. The time-gap can be configured to reduce RTT measurement error resulting from clock-drift associated with the UE 406. The gNB 404 can then transmit the SRS configuration 412 to the UE 406. The UE 406 can adjust the subsequent transmission of one or more resources, e.g., SRS resources to the gNB 404 based on a time-gap that is indicated by the SRS configuration 412.

In some aspects, the SRS configuration 412 can also include at least one Timing Advance (TA) command, for example, that is configured to cause subsequent SRS resources to be transmitted by the UE 406 using a common TA. By way of example, the TA command (referred to as n-TimingAdvanceOffset in the 3GPP Standard) can be used by the UE 406 to determine an NTA offset parameter, for example, that indicates an offset between downlink and uplink timing. In some examples, the gNB 404 can communication the SRS configuration 412 to the UE 406 using radio resource control (RRC) signaling, a physical downlink control channel (PDCCH), Downlink Control Information (DCI), Medium Access Control information (e.g., MAC CE information), LTE Positioning (LPP) information, or any combination thereof, and/or other downlink signaling. In some implementations, the gNB 404 can also communicate the time-gap information (SRS gap 414) to the LMF 402.

As discussed above, the time-gap received by the UE 406 in the SRS configuration 412 can be utilized by the UE 406 to minimize RTT measurement errors using an asynchronous reference signal exchange with the gNB 404. In such aspects, the time-gap may be associated with signaling window information, for example, that specifies a signaling window in which one or more resource sets can be transmitted by the UE 406. For example, the time-gap can be configured to meet or exceed a time duration of the threshold 410, and the signaling window can indicate a time following the gap duration in which resource transmission should occur to minimize RTT measurement error. For example, the threshold can be used to set a drift-correction reference duration between SRS resource transmissions by the UE 406, as discussed above with respect to FIG. 3B, and the signaling window can be used to define a later temporal boundary, before which, SRS resource transmission by the UE 406 should be scheduled, e.g., to minimize RTT measurement error. Further discussion regarding an example asynchronous communication of SRS resources is provided in conjunction with FIGS. 5A and 5B, below.

In some aspects, the time-gap can be configured to minimize RTT measurement errors using a synchronous reference signal exchange, e.g., between the UE 406 and the gNB 404. In such implementations, the time-gap between SRS resources transmitted by the UE 406 can be periodic, and can minimize the effects of clock-drift on RTT measurements. In such approaches, the time-gap can be used to specify SRS resource transmission periodicity at the UE 406. Depending on the desired implementation, the UE 406 can be configured to transmit one or more pairs of SRS resources at regular time intervals specified by the time-gap. Alternatively, the UE 406 can be configured to transmit a single SRS resource set, followed by a copy of the single SRS resource set that is transmitted after a time delay specified by the time-gap. In some implementations, the one or more SRS resources transmitted by the UE 406 can be transmitted on a common Timing Advance (TA). Further discussion regarding the synchronous exchange or SRS resources is provided in conjunction with FIG. 6, below.

In some aspects, the LMF 402, the gNB 404 and/or the UE 406 can include means for performing operations described herein. For example, the means for performing operations described herein may include one or more of input device(s), SIM(s), modems(s), wireless transceiver(s), output device(s), DSP(s), processors, memory device(s), and/or antenna(s).

In some aspects, the gNB 404 can include means for obtaining a threshold associated with a user equipment (UE) device (e.g., UE 406), and means for determining, based on the threshold, resource configuration information for the UE device 406. In some aspects, the gNB 404 can further include means for receiving the resource configuration information indicating a time-gap between Sounding Reference Signal (SRS) resources associated with the UE device 406, and means for transmitting the resource configuration information to the UE device 406.

In some aspects, the UE 406 can include means for receiving resource configuration information, wherein the resource configuration information is based on a threshold associated with the apparatus, and wherein the resource configuration information indicates a time-gap for transmission of Sounding Reference Signal (SRS) resources. In some aspects, the UE 406 may further include means for transmitting one or more SRS resources based on the time-gap indicated by the resource configuration information.

In some examples, the means for receiving can include the one or more wireless transceivers, one or more modems, one or more SIMs, one or more processors, one or more DSPs, one or more memory devices, any combination thereof, and/or other component(s). In some examples, the means for determining can include the one or more processors, one or more DSPs, one or more memory devices, any combination thereof, or other component(s). In some examples, the means for transmitting can include the one or more wireless transceivers, one or more modems, one or more SIMs, one or more processors, one or more DSPs, one or more memory devices, any combination thereof, or other component(s).

Figure 5A:
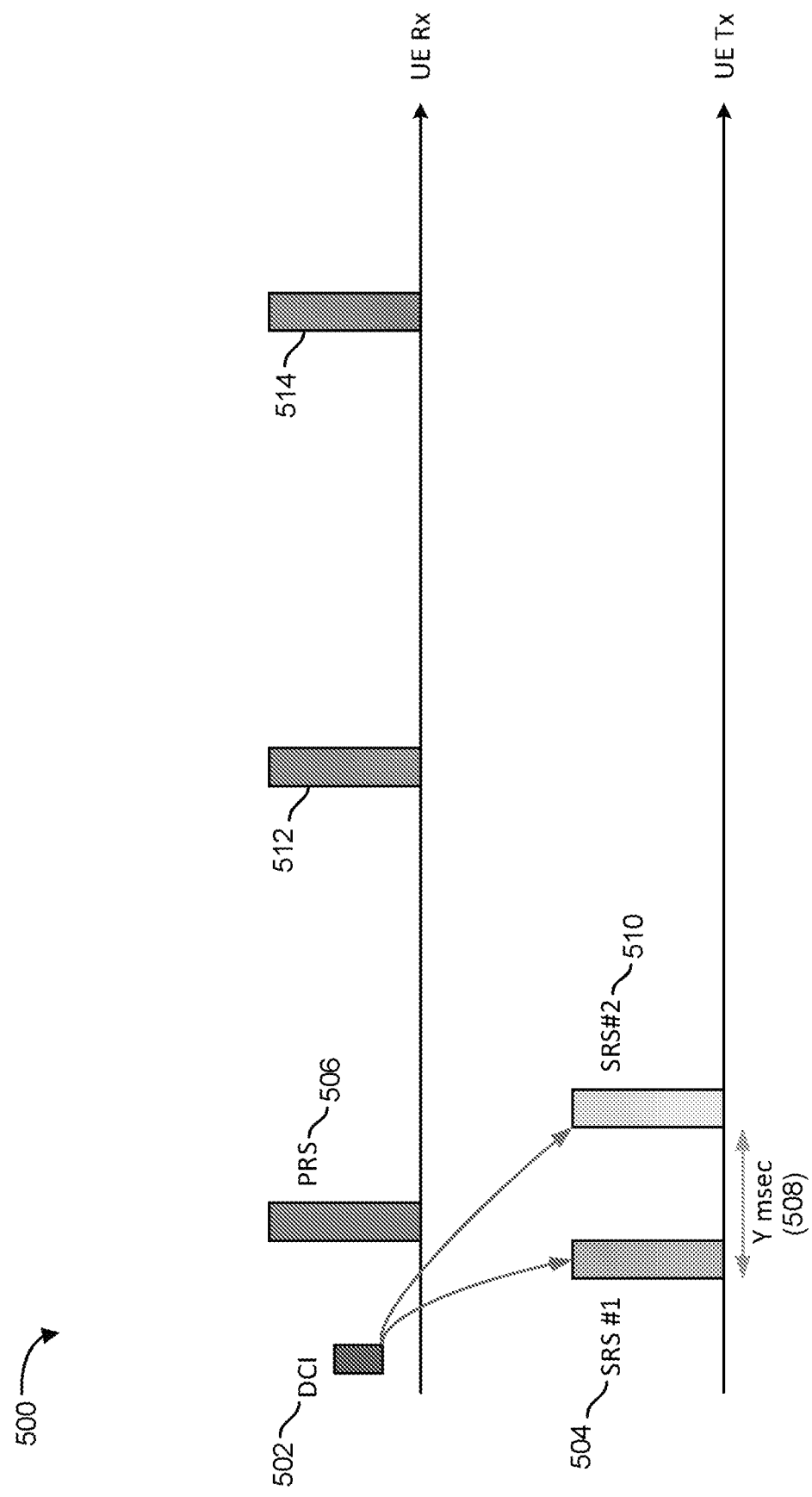
FIG. 5A is a diagram illustrating an example resource transmission schedule in which round-trip-time measurement error is mitigated through asynchronous Sounding Reference Signal (SRS) resource transmission by a User Equipment (UE) device, according to some aspects of the present disclosure.

FIG. 5A illustrates an example resource transmission schedule 500 in which round-trip-time (RTT) measurement error is mitigated through asynchronous Sounding Reference Signal (SRS) transmission by a User Equipment (UE) device. In the example schedule 500, Downlink Control Information (DCI) 502 received by a UE is used to communicate a resource schedule that is configured to mitigate RTT measurement error. In this example, a time-gap 508 specifying a time (or slot) distance between transmitted SRS resource sets (504, 510) is implemented by the UE, and the time-gap is equal to or greater than a threshold time associated with the UE. In the example of FIG. 5A, a first SRS resource set 504 is transmitted by the UE, followed by receipt of a PRS resource 506 at the UE. A second SRS resource set 510 is then transmitted by the UE according to a time-gap 508 that equals or exceeds a time duration corresponding with the threshold. One or more additional PRS resources (512, 514) can then be received at the UE. As discussed above, the SRS resources can be transmitted by the UE on a common Timing Advance (TA). In some approaches, the resource schedule can also include signaling window information that specifies a latter time-boundary in which the SRS resources can be transmitted by the UE, as discussed in further detail with respect to FIG. 5B, below.

In some implementations, the threshold can be determined based on a capability of the UE, e.g., based on information associated with a capability report of the UE. For example, the threshold may be determined or referenced by a location server, as discussed above with respect to FIG. 4. Depending on the desired implementation, the threshold can be based on various attributes associated with the UE, and/or the corresponding network setup. By way of example, the threshold can be based on a bandwidth of the UE device, a bandwidth of one or more SRS resources associated with the UE device (e.g., resource sets 504, 510), or a combination thereof.

Figure 5B:
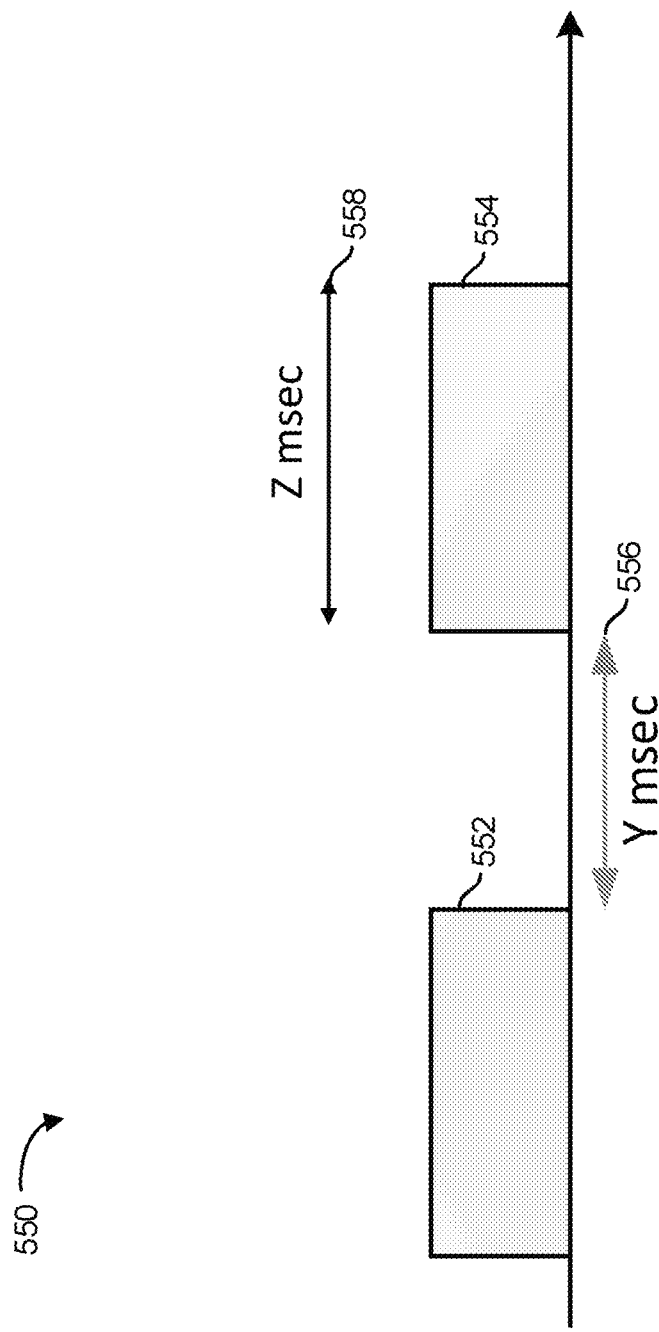
FIG. 5B is a diagram illustrating an example of signaling windows that can be used to facilitate the scheduling of asynchronous Sounding Reference Signal (SRS) resource transmission by a User Equipment (UE) device, according to some aspects of the present disclosure.

FIG. 5B is a diagram illustrating an example of signaling windows 550 that can be used to facilitate the scheduling of asynchronous Sounding Reference Signal (SRS) resource transmission by a User Equipment (UE) device. In the example of FIG. 5B, signaling windows 552 and 554 can represent time periods in which SRS resource transmission can be performed, while minimizing RTT measurement error. In the illustrated example, signaling windows 552 and 554 are separated by a time-gap 556 (e.g., y msec). As discussed above, the duration of the time-gap 556 can be based on a threshold that is determined for an associated UE device. In the example of FIG. 5B, a signaling window 558 (or signaling window duration) is specified as Z msec. In some aspects, the signaling window 558 may be greater than or equal to the threshold 556. In some aspects, the signaling window 558 may be less than the threshold 556. Depending on the desired implementation, the signaling window 558 may be based on the threshold, and/or may be based on information associated with the UE, such as information in a capability report of the UE.

Figure 6:
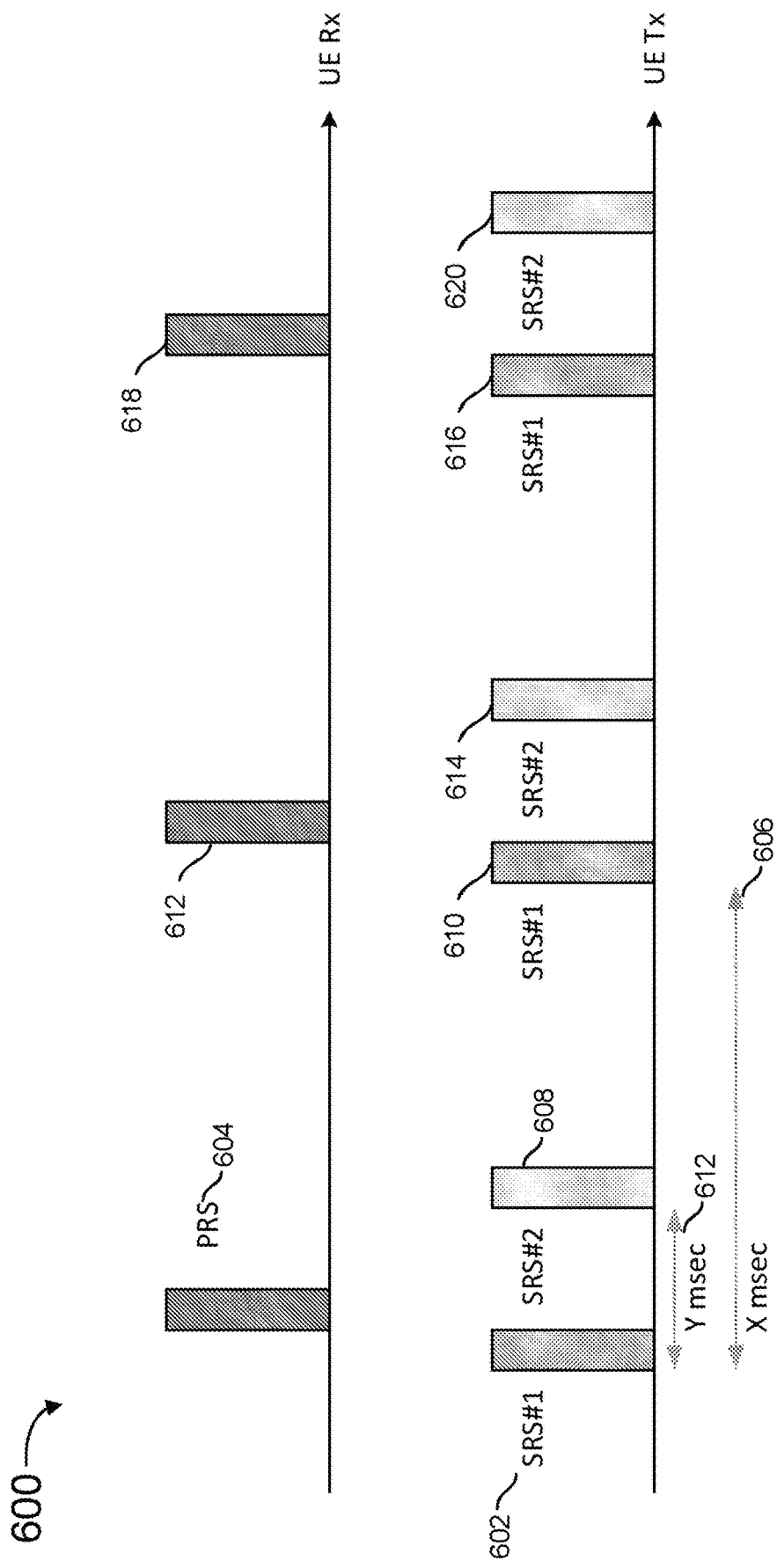
FIG. 6 is a diagram illustrating another example of a resource transmission schedule in which round-trip-time measurement error is mitigated through synchronous SRS transmission by a UE device, according to some aspects of the present disclosure.

FIG. 6 illustrates an example resource transmission schedule 600 in which round-trip-time measurement error is mitigated through synchronous Sounding Reference Signal (SRS) transmission by a User Equipment (UE) device. In the example schedule 600, the UE implements a resource schedule configured to mitigate RTT measurement error through the periodic transmission of SRS resource sets. In some approaches, SRS resource transmission can be performed at periodic intervals specified by time-gap information, as discussed above. For example, a first SRS resource set 602 can be transmitted, and following the receipt of PRS resource 604, a copy of the first SRS resource 608 can be transmitted, e.g., after a time-gap 612 that is specified by resource configuration information. As illustrated in the example of FIG. 6, resource copies (or images) can be used for subsequently transmitted SRS resource sets. For example, SRS resource set 610 can be transmitted, and following the receipt of PRS resource 612, a copy SRS resource set 614 can then be transmitted. Similarly, SRS resource set 616 can be transmitted, and following the receipt of PRS resource 618, a copy SRS resource set 620 can then be transmitted.

In other approaches, the time-gap can be used to set a period for transmission of subsequent resource sets. For example, a first SRS resource set 602 can be transmitted, and following the receipt of PRS resource 604, a second SRS resource 610 can be transmitted, e.g., after a time-gap 606 that is specified by resource configuration information. As illustrated in the example of FIG. 6, subsequent resource sets can be transmitted in accordance with a period based on time-gap 606. For example, SRS resource set 610 can be transmitted, and following the receipt of PRS resource 612, SRS resource set 616 can then be transmitted, after time-gap 606.

Figure 7:
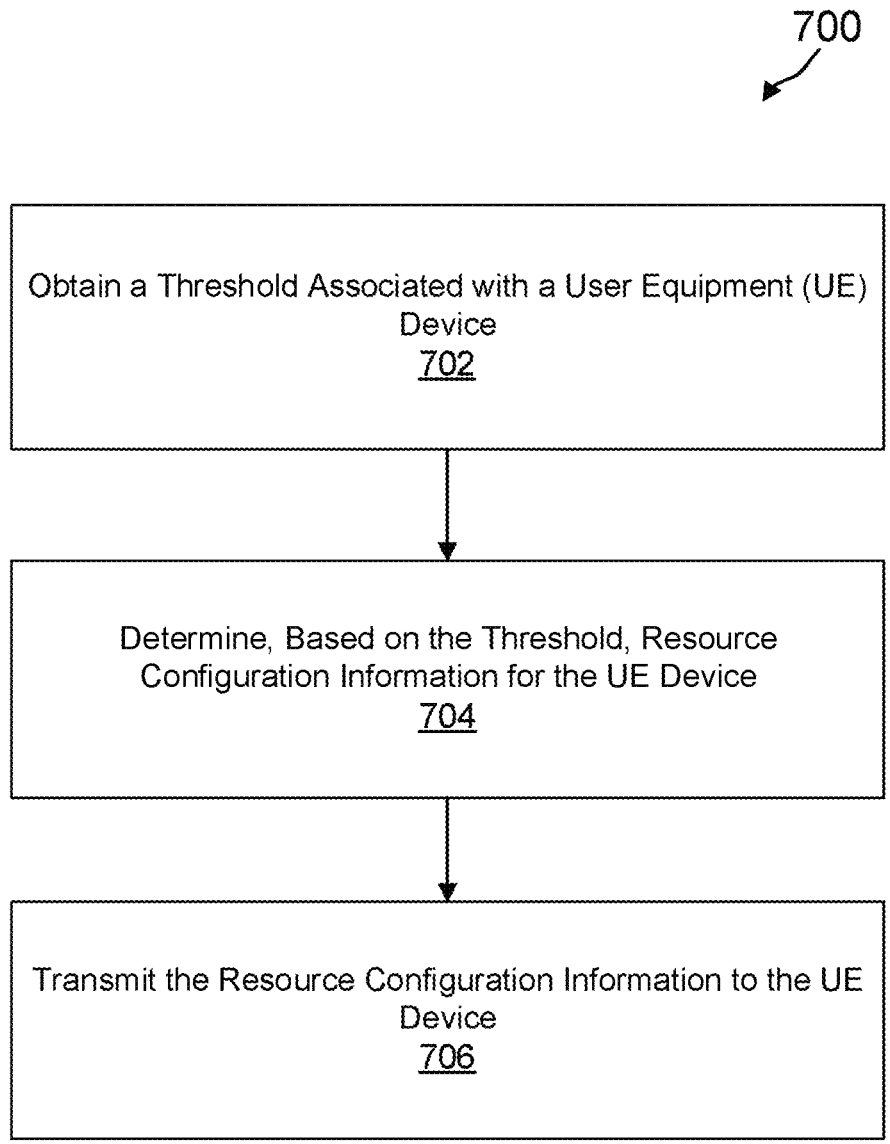
FIG. 7 is a flow diagram illustrating an example of a process for adjusting a resource transmission schedule at a UE device using resource configuration information, according to some aspects of the present disclosure.

FIG. 7 illustrates a flow diagram of an example process 700 for adjusting a resource transmission schedule at a User Equipment (UE) device (e.g., a mobile device) using resource configuration information. At block 702, the process 700 includes obtaining a threshold associated with a UE device, for example, by a base station or gNB. Depending on the desired implementation, the threshold can be referenced, derived, or determined from capability information associated with the UE device. For example, the threshold can be determined (e.g., by a location server, such as an LMF) based on a capability report of the UE device, a bandwidth of the UE device, a bandwidth of the SRS resources associated with the UE device, or a combination thereof.

In some aspects, the threshold can be received at the gNB from a location server, such as an LMF 402, discussed above with respect to FIG. 4. In such instances, the LMF can determine the threshold information, for example, via lookup (e.g., using a lookup table) or another calculation that is performed based on information in a capability report, such as capability report 408, that is received at the LMF (e.g., LMF 402) from the UE device (e.g., UE device 406). In some examples, as noted above, the threshold can be based on various UE device characteristics or other network parameters, such as a bandwidth of the UE device, a bandwidth of one or more SRS resources associated with the UE device, or a combination thereof.

At block 704, the process 700 includes determining resource configuration information for the UE device. In some aspects, the resource configuration information can be determined based on the threshold obtained (e.g., received by an LMF) at block 702. In some examples, the resource configuration information can include a time-gap between Sounding Reference Signal (SRS) resources associated with the UE device. For example, the time-gap can be or can indicate a duration of time that is to be provided between the SRS resources associated with the UE device, as discussed herein.

At block 706, the process 700 includes transmitting (e.g., by the gNB) the resource configuration information to the UE device. The resource configuration information is based on the threshold and includes information indicating the time-gap (e.g., the duration of time that is to be provided between the SRS resources associated with the UE device). As discussed above, for asynchronous SRS resource transmission scenarios, the time-gap can specify a minimum duration of time between transmission of different SRS resources by the UE device. In such instances, the time-gap can be greater than, or equal to, a duration of time corresponding with the threshold. In such approaches, the time gap can be configured to mitigate RTT measurement error by ensuring adequate time (e.g., a drift-correction reference duration) between SRS resource sets transmitted by the UE device.

In some aspects, the resource configuration information can include signaling window information, for example, specifying a signaling window for transmission of one or more SRS resources by the UE device. As discussed above with respect to FIG. 5B, the signaling window can be associated with the time-gap and can specify a latter time-boundary before which the SRS resources can be transmitted by the UE. As such, the scheduled transmission of SRS resources, separated by a time duration specified by the time-gap, and occurring within a time duration specified by the signaling window, can be used to reduce RTT measurement errors in asynchronous resource exchange scenarios.

For synchronous SRS resource transmission scenarios, the time-gap can specify a regular time interval or period for transmission of two or more SRS resources by the UE device. In such examples, the time-gap information from the resource configuration can be configured to mitigate RTT measurement error through the periodic transmission of SRS resource sets. In such approaches, SRS resource transmission by the UE device can be performed at periodic intervals specified by (or based on) the time-gap. Additionally, in some examples, the resource configuration information can include at least one Timing Advance (TA) command associated with the SRS resources, for example, wherein the TA command is configured to cause the SRS resources to be transmitted by the UE device using a common TA.

In some aspects, the process 700 can include receiving (e.g., using at least one transceiver) at least one SRS resource from the UE device that is based on the time-gap indicated by the resource configuration information. The process 700 can include transmitting (e.g., using the at least one transceiver) at least one Positioning Reference Signal (PRS) resource to the UE device. For instance, the SRS resource can include the SRS resource 504 and the PRS resources can include the PRS resource 506.

Figure 8:
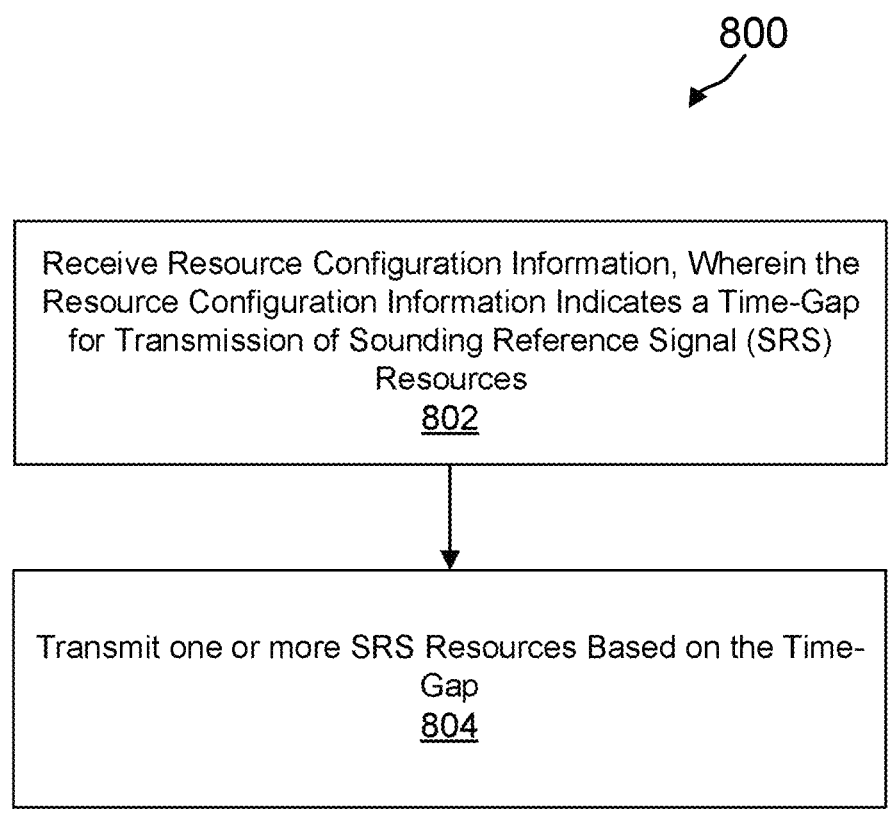
FIG. 8 is a flow diagram illustrating an example of a process for adjusting the transmission of one or more SRS resources based on a time-gap specified in received resource configuration information, according to some aspects of the present disclosure.

FIG. 8 illustrates a flow diagram of an example process 800 for adjusting the transmission of one or more SRS resources based on a time-gap specified in received resource configuration information. At block 802, the process 800 includes receiving (e.g., by a UE device) resource configuration information. The resource configuration information is based on a threshold corresponding to the UE device. The resource configuration information indicates a time-gap for transmission of Sounding Reference Signal (SRS) resources. As discussed above, the time-gap can be configured to reduce a RTT measurement error caused by a clock drift between the UE device and a corresponding base station (e.g., a gNB). In some aspects, the resource configuration information can further include signaling window information, for example, that specifies a signaling window for transmission of one or more SRS resources by the UE device.

At block 804, the process 800 includes transmitting (e.g., by the UE device) one or more SRS resources based on the time-gap indicated in block 802. The time-gap received by the UE device in the SRS configuration can be used by the UE to minimize RTT measurement errors using an asynchronous reference signal exchange, e.g., with an associated gNB. In such implementations, the time-gap can be configured to meet or exceed a time duration of the threshold. For example, the threshold can be used to set a drift-correction reference duration between SRS resource transmissions by the UE device, as discussed above. As discussed above, a signaling window can be associated with the time-gap and can specify a latter time-boundary before which the SRS resources can be transmitted by the UE. As such, the scheduled transmission of SRS resources, separated by a time duration specified by the time-gap, and occurring within a time duration specified by the signaling window, can be used to reduce RTT measurement errors in asynchronous resource exchange scenarios.

In some aspects, the process 800 can include receiving (e.g., using at least one transceiver) at least one Positioning Reference Signal (PRS) resource. For instance, the transmitted one or more SRS resources can include the SRS resource 504 and/or the SRS resources 510, and the received PRS resources can include the PRS resource 506.

In other aspects, the time-gap can be configured to minimize RTT measurement errors using a synchronous reference signal exchange, e.g., between the UE device and the corresponding gNB. In such implementations, the time-gap between SRS resources transmitted by the UE device can be periodic, thereby minimizing the effects of clock-drift on RTT measurements. In such approaches, the time-gap can be used to specify SRS resource transmission periodicity at the UE device. Depending on the desired implementation, the UE device can be configured to transmit one or more pairs of SRS resources at regular (periodic) time intervals specified by the time-gap. Alternatively, the UE device can be configured to transmit a single SRS resource set, followed by a copy (or image) of the single SRS resource set that is transmitted after a time delay specified by the time-gap. In some implementations, the one or more SRS resources transmitted by the UE device can be transmitted on a common Timing Advance (TA). As discussed above, transmission of one or more SRS resource sets can be performed according to Timing Advance (TA) command information contained in the resource configuration information. For example, The TA command can cause the UE to transmit two or more SRS resource sets using a common TA.

In some examples, the processes described herein (e.g., processes 700, 800 and/or other processes described herein) may be performed by a computing device or apparatus. In one example, the processes 700 and/or 800 can be performed by a computing device or the computing system 1000 shown in FIG. 10.

In some examples, the computing device can include any suitable UE device or system, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. For instance, as noted above, a UE device can be configured to perform the process 800. In some examples, the computing device can include a base station, such as a gNB and/or any other computing device with the resource capabilities to perform the processes described herein. For instance, as noted above, a gNB can be configured to perform the process 700. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the operations or steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), Vision Processing Units (VPUs), Network Signal Processors (NSPs), microcontrollers (MCUs) and/or other suitable electronic circuits), and/or can include and/or be implemented using computer software, firmware, or any combination thereof, to perform the various operations described herein.

Process 600 illustrates a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 600 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
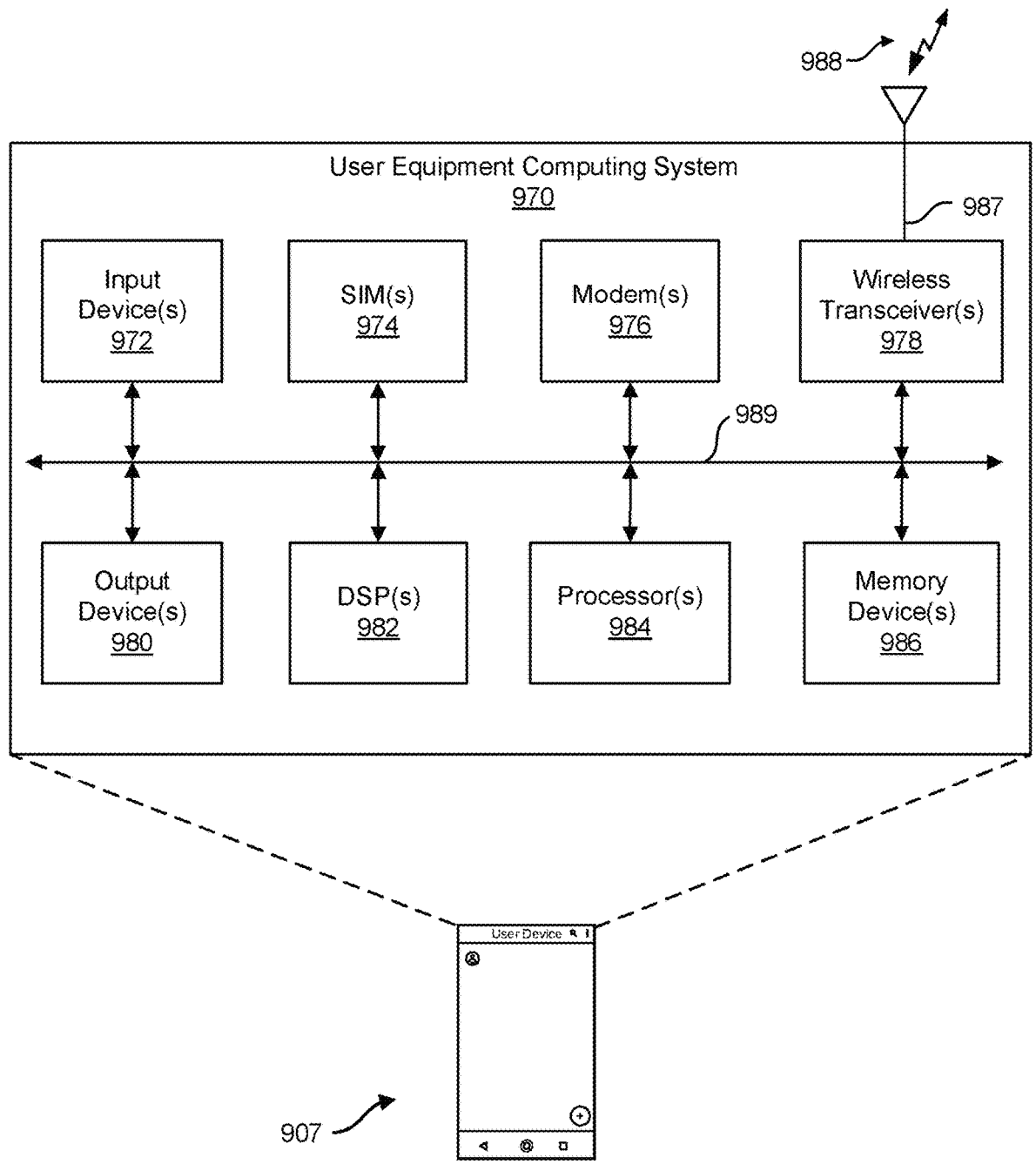
FIG. 9 illustrates an example block diagram of a computing system of a user equipment (UE), in accordance with some aspects of the present disclosure.

FIG. 9 illustrates an example of a computing system 970 of a user equipment (UE) 907. In some examples, the UE 907 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 970 includes software and hardware components that can be electrically coupled via a bus 989 (or may otherwise be in communication, as appropriate). For example, the computing system 970 includes one or more processors 984. The one or more processors 984 can include one or more CPUs, ASICs, FPGAs, APs, GPUs, VPUs, NSPs, microcontrollers, dedicated hardware, any combination thereof, and/or other processing device or system. The bus 989 can be used by the one or more processors 984 to communicate between cores and/or with the one or more memory devices 986.

The computing system 970 may also include one or more memory devices 986, one or more digital signal processors (DSPs) 982, one or more subscriber identity modules (SIMs) 974, one or more modems 976, one or more wireless transceivers 978, an antenna 987, one or more input devices 972 (e.g., a camera, a mouse, a keyboard, a touch sensitive screen, a touch pad, a keypad, a microphone, and/or the like), and one or more output devices 980 (e.g., a display, a speaker, a printer, and/or the like).

The one or more wireless transceivers 978 can transmit and receive wireless signals (e.g., signal 988) via antenna 987 to and from one or more other devices, such as one or more other UEs, network devices (e.g., base stations such as eNBs and/or gNBs, WiFi routers, etc.), cloud networks, and/or the like. As described herein, the one or more wireless transceivers 978 can include a combined transmitter/receiver, discrete transmitters, discrete receivers, or any combination thereof. In some examples, the computing system 970 can include multiple antennae. The wireless signal 988 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 978 may include a radio frequency (RF) front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 988 into a baseband or intermediate frequency and can convert the RF signals to the digital domain.

In some cases, the computing system 970 can include a coding-decoding device (or CODEC) configured to encode and/or decode data transmitted and/or received using the one or more wireless transceivers 978. In some cases, the computing system 970 can include an encryption-decryption device or component configured to encrypt and/or decrypt data (e.g., according to the AES and/or DES standard) transmitted and/or received by the one or more wireless transceivers 978.

The one or more SIMs 974 can each securely store an International Mobile Subscriber Identity (IMSI) number and a related key assigned to the user of the UE 907. The IMSI and the key can be used to identify and authenticate the subscriber when accessing a network provided by a network service provider or operator associated with the one or more SIMs 974. The one or more modems 976 can modulate one or more signals to encode information for transmission using the one or more wireless transceivers 978. The one or more modems 976 can also demodulate signals received by the one or more wireless transceivers 978 in order to decode the transmitted information. In some examples, the one or more modems 976 can include a 4G (or LTE) modem, a 5G (or NR) modem, a Bluetooth™ modem, a modem configured for vehicle-to-everything (V2X) communications, and/or other types of modems. In some examples, the one or more modems 976 and the one or more wireless transceivers 978 can be used for communicating data for the one or more SIMs 974.

The computing system 970 can also include (and/or be in communication with) one or more non-transitory machine-readable storage media or storage devices (e.g., one or more memory devices 986), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 986 and executed by the one or more processor(s) 984 and/or the one or more DSPs 982. The computing system 970 can also include software elements (e.g., located within the one or more memory devices 986), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the UE 907 can include means for performing operations described herein. The means can include one or more of the components of the computing system 970. For example, the means for performing operations described herein may include one or more of input device(s) 972, SIM(s) 974, modems(s) 976, wireless transceiver(s) 978, output device(s) (980), DSP(s) 982, processors (984), memory device(s) 986, and/or antenna(s) 987.

In some aspects, the UE 907 can include means for receiving resource configuration information, wherein the resource configuration information is based on a threshold associated with the apparatus, and wherein the resource configuration information indicates a time-gap for transmission of Sounding Reference Signal (SRS) resources. In some aspects, the UE 907 may further include means for transmitting one or more SRS resources based on the time-gap indicated by the resource configuration information.

In some examples, the means for receiving can include the one or more wireless transceivers 978, the one or more modems 976, the one or more SIMs 974, the one or more processors 984, the one or more DSPs 982, the one or more memory devices 986, any combination thereof, or other component(s) of the client device. In some examples, the means for determining can include the one or more processors 984, the one or more DSPs 982, the one or more memory devices 986, any combination thereof, or other component(s) of the client device. In some examples, the means for transmitting can include the one or more wireless transceivers 978, the one or more modems 976, the one or more SIMs 974, the one or more processors 984, the one or more DSPs 982, the one or more memory devices 986, any combination thereof, or other component(s) of the client device.

Figure 10:
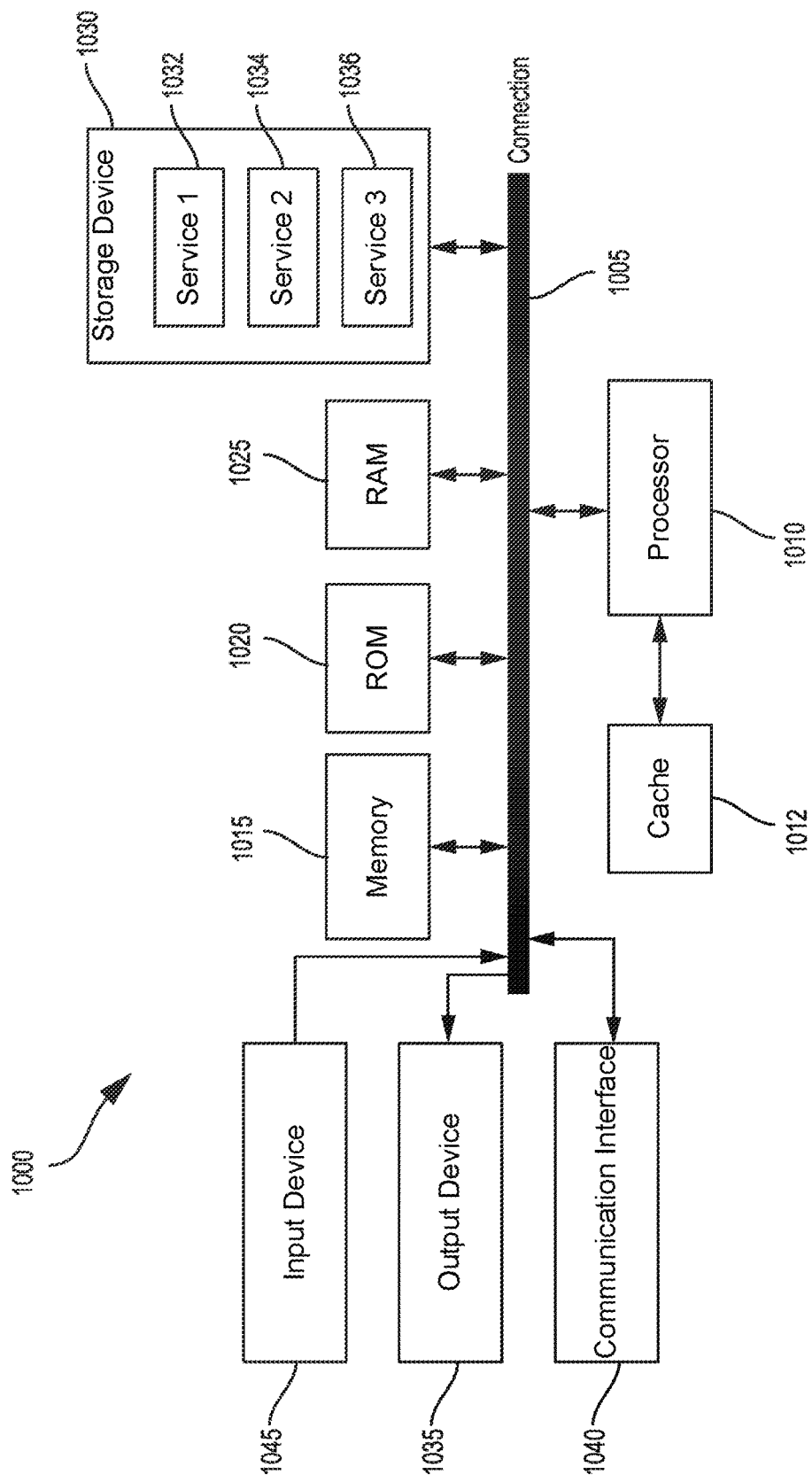
FIG. 10 illustrates an example computing system, according to aspects of the disclosure.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random-access memory (RAM) 1025 to processor 1010. Computing system 1000 can include a cache 1012 of high-speed memory connected directly with, in close proximity to, or integrated as part of processor 1010.

Processor 1010 can include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data that cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: an apparatus for facilitating round trip time (RTT) positioning, the apparatus comprising: at least one transceiver; at least one memory; and at least one processor coupled to the at least one transceiver and the at least one memory and configured to: obtain a threshold associated with a user equipment (UE) device; determine, based on the threshold, resource configuration information for the UE device, the resource configuration information indicating a time-gap between Sounding Reference Signal (SRS) resources associated with the UE device; and transmit, via the at least one transceiver, the resource configuration information to the UE device.

Aspect 2: the apparatus of aspect 1, wherein the time-gap is configured to reduce round-trip-time (RTT) measurement error resulting from a clock drift associated with the UE device.

Aspect 3: the apparatus of any of aspects 1-2, wherein the at least one processor is further configured to: transmit, via the at least one transceiver, the time-gap to a location server.

Aspect 4: the apparatus of any of aspects 1-3, wherein, to obtain the threshold, the at least one processor is configured to: receive the threshold from a location server.

Aspect 5: the apparatus of any of aspects 1-4, wherein the resource configuration information further comprises signaling window information, the signaling window information specifying a signaling window for transmission of one or more SRS resources by the UE device.

Aspect 6: the apparatus of any of aspects 1-5, wherein the time-gap between the SRS resources is greater than or equal to the threshold.

Aspect 7: the apparatus of any of aspects 1-6, wherein the resource configuration information includes at least one Timing Advance (TA) command associated with the SRS resources, the at least one TA command being configured to cause the SRS resources to be transmitted by the UE device using a common TA.

Aspect 8: the apparatus of any of aspects 1-7, wherein the resource configuration information specifies at least a single SRS resource and a copy of the single SRS resource, the single SRS resource and the copy of the single SRS resource separated by the time-gap, or at least two SRS resources with an equal periodicity, or a combination thereof.

Aspect 9: the apparatus of any of aspects 1-8, wherein the threshold is based on a capability report of the UE device, a bandwidth of the UE device, a bandwidth of the SRS resources associated with the UE device, or a combination thereof.

Aspect 10: the apparatus of any of aspects 1-9, wherein the at least one processor is further configured to: receive, via the at least one transceiver, at least one SRS resource from the UE device, wherein the at least one SRS resource is based on the time-gap indicated by the resource configuration information; and transmit, via the at least one transceiver, at least one Positioning Reference Signal (PRS) resource to the UE device.

Aspect 11: a computer-implemented method for facilitating round trip time (RTT) positioning, the method comprising: obtaining a threshold associated with a user equipment (UE) device; determining, based on the threshold, resource configuration information for the UE device, the resource configuration information indicating a time-gap between Sounding Reference Signal (SRS) resources associated with the UE device; and transmitting the resource configuration information to the UE device.

Aspect 12: the computer-implemented method of aspect 11, wherein the time-gap is configured to reduce round-trip-time (RTT) measurement error resulting from a clock drift associated with the UE device.

Aspect 13: the computer-implemented method of any of aspects 11-12, further comprising: transmitting the time-gap to a location server.

Aspect 14: the computer-implemented method of any of aspects 11-13, wherein obtaining the threshold further comprises: receiving the threshold from a location server.

Aspect 15: the computer-implemented method of any of aspects 11-14, wherein the resource configuration information further comprises signaling window information, the signaling window information specifying a signaling window for transmission of one or more SRS resources by the UE device.

Aspect 16: the computer-implemented method of any of aspects 11-15, wherein the time-gap between the SRS resources is greater than or equal to the threshold.

Aspect 17: the computer-implemented method of any of aspects 11-16, wherein the resource configuration information includes at least one Timing Advance (TA) command associated with the SRS resources, the at least one TA command being configured to cause the SRS resources to be transmitted by the UE device using a common TA.

Aspect 18: the computer-implemented method of any of aspects 11-17, wherein the resource configuration information specifies at least a single SRS resource and a copy of the single SRS resource, the single SRS resource and the copy of the single SRS resource separated by the time-gap, or at least two SRS resources with an equal periodicity, or a combination thereof.

Aspect 19: the computer-implemented method of any of aspects 11-18, wherein the threshold is based on a capability report of the UE device, a bandwidth of the UE device, a bandwidth of the SRS resources associated with the UE device, or a combination thereof.

Aspect 20: the computer-implemented method of any of aspects 11-19, further comprising: receiving at least one SRS resource from the UE device, wherein the at least one SRS resource is based on the time-gap indicated by the resource configuration information; and transmitting at least one Positioning Reference Signal (PRS) resource to the UE device.

Aspect 21: an apparatus for facilitating round trip time (RTT) positioning, the apparatus comprising: means for obtaining a threshold associated with a user equipment (UE) device; means for determining, based on the threshold, resource configuration information for the UE device, the resource configuration information indicating a time-gap between Sounding Reference Signal (SRS) resources associated with the UE device; and means for transmitting the resource configuration information to the UE device.

Aspect 22: the apparatus of aspect 21, wherein the time-gap is configured to reduce round-trip-time (RTT) measurement error resulting from a clock drift associated with the UE device.

Aspect 23: the apparatus of any of aspects 21-22, further comprising: means for transmitting the time-gap to a location server.

Aspect 24: the apparatus of any of aspects 21-23, wherein the means for obtaining the threshold is configured to receive the threshold from a location server.

Aspect 25: the apparatus of claim 21-24, wherein the resource configuration information further comprises signaling window information, the signaling window information specifying a signaling window for transmission of one or more SRS resources by the UE device.

Aspect 26: the apparatus of any of aspects 21-25, wherein the time-gap between the SRS resources is greater than or equal to the threshold.

Aspect 27: the apparatus of any of aspects 21-26, wherein the resource configuration information includes at least one Timing Advance (TA) command associated with the SRS resources, the at least one TA command being configured to cause the SRS resources to be transmitted by the UE device using a common TA.

Aspect 28: the apparatus of any of aspects 21-27, wherein the resource configuration information specifies at least a single SRS resource and a copy of the single SRS resource, the single SRS resource and the copy of the single SRS resource separated by the time-gap, or at least two SRS resources with an equal periodicity, or a combination thereof.

Aspect 29: the apparatus of any of aspects 21-28, wherein the threshold is based on a capability report of the UE device, a bandwidth of the UE device, a bandwidth of the SRS resources associated with the UE device, or a combination thereof.

Aspect 30: the apparatus of any of aspects 21-29, further comprising: means for receiving at least one SRS resource from the UE device, wherein the at least one SRS resource is based on the time-gap indicated by the resource configuration information; and means for transmitting at least one Positioning Reference Signal (PRS) resource to the UE device.

Aspect 31: an apparatus for facilitating round trip time (RTT) positioning, the apparatus comprising: at least one transceiver; at least one memory; and at least one processor coupled to the at least one transceiver and the at least one memory and configured to: receive, via the at least one transceiver, resource configuration information, wherein the resource configuration information is based on a threshold corresponding to the apparatus, and wherein the resource configuration information indicates a time-gap for transmission of Sounding Reference Signal (SRS) resources; and transmit, via the at least one transceiver, one or more SRS resources based on the time-gap indicated by the resource configuration information.

Aspect 32: the apparatus of aspect 31, wherein the time-gap is configured to reduce a clock drift associated with the apparatus.

Aspect 33: the apparatus of any of aspects 31-32, wherein the time-gap for the SRS resources is greater than or equal to the threshold.

Aspect 34: the apparatus of any of aspects 31-33, wherein the one or more SRS resources are transmitted on a common Timing Advance (TA).

Aspect 35: the apparatus of any of aspects 31-34, wherein the resource configuration information specifies two SRS resources with an equal periodicity.

Aspect 36: the apparatus of any of aspects 31-35, wherein the resource configuration information specifies a single SRS resource and a copy of the single SRS resource, wherein the single SRS resource and the copy of the single SRS resource are separated by the time-gap.

Aspect 37: the apparatus of any of aspects 31-36, wherein the at least one processor is further configured to: transmit capability information to a location server.

Aspect 38: the apparatus of any of aspects 31-37, wherein the at least one processor is further configured to: receive at least one Positioning Reference Signal (PRS) resource.

Aspect 39: a computer-implemented method for facilitating round trip time (RTT) positioning, the method comprising: receiving, by a user equipment (UE) device, resource configuration information, wherein the resource configuration information is based on a threshold corresponding to the UE device, and wherein the resource configuration information indicates a time-gap for transmission of Sounding Reference Signal (SRS) resources; and transmitting, by the UE device, one or more SRS resources based on the time-gap indicated by the resource configuration information.

Aspect 40: the computer-implemented method of aspect 39, wherein the time-gap is configured to reduce a clock drift associated with the UE device.

Aspect 41: the computer-implemented method of any of aspects 39-40, wherein the time-gap for the SRS resources is greater than or equal to the threshold.

Aspect 42: the computer-implemented method of any of aspects 39-41, wherein the one or more SRS resources are transmitted on a common Timing Advance (TA).

Aspect 43: the computer-implemented method of any of aspects 39-42, wherein the resource configuration information specifies two SRS resources with an equal periodicity.

Aspect 44: the computer-implemented method of any of aspects 39-43, wherein the resource configuration information specifies a single SRS resource and a copy of the single SRS resource, and wherein the single SRS resource and the copy of the single SRS resource are separated by the time-gap.

Aspect 45: the computer-implemented method of any of aspects 39-44, further comprising receiving at least one Positioning Reference Signal (PRS) resource.

Aspect 46: the computer-implemented method of any of aspects 39-45, further comprising transmitting capability information to a location server.

Aspect 47: an apparatus for facilitating round trip time (RTT) positioning, the apparatus comprising: means for receiving resource configuration information, wherein the resource configuration information is based on a threshold associated with the apparatus, and wherein the resource configuration information indicates a time-gap for transmission of Sounding Reference Signal (SRS) resources; and means for transmitting one or more SRS resources based on the time-gap indicated by the resource configuration information.

Aspect 48: the apparatus of aspect 47, wherein the time-gap is configured to reduce a clock drift associated with the apparatus.

Aspect 49: the apparatus of any of aspects 47-48, wherein the time-gap for the SRS resources is greater than or equal to the threshold.

Aspect 50: the apparatus of any of aspects 47-49, wherein the resource configuration information specifies two SRS resources with an equal periodicity.

Aspect 51: the apparatus of any of aspects 47-50, wherein the resource configuration information specifies a single SRS resource and a copy of the single SRS resource, wherein the single SRS resource and the copy of the single SRS resource are separated by the time-gap.

Aspect 52: the apparatus of any of aspects 47-51, further comprising: means for transmitting capability information to a location server.

Aspect 53: the apparatus of any of aspects 47-52, further comprising: means for receiving at least one Positioning Reference Signal (PRS) resource.

Aspect 54: apparatus for facilitating round trip time (RTT) positioning, the apparatus comprising: at least one transceiver; at least one memory; and at least one processor coupled to the at least one transceiver and the at least one memory and configured to: receive, via the at least one transceiver, capability information associated with a user equipment (UE) device; and transmit, via the at least one transceiver, a threshold associated with the UE device, wherein the threshold is based on the capability information.

Aspect 55: the apparatus of aspect 54, wherein the at least one processor is further configured to: receive, via the at least one transceiver, a time-gap associated with the UE device, wherein the time-gap is associated with a transmission of one or more Sounding Reference Signal (SRS) resources by the UE device.

Aspect 56: a method for facilitating round trip time (RTT) positioning, comprising: receiving, by a location server, capability information associated with a user equipment (UE) device; and transmitting, by the location server, a threshold associated with the UE device, wherein the threshold is based on the capability information.

Aspect 57: the method of aspect 56, further comprising: receiving a time-gap associated with the UE device, wherein the time-gap is associated with a transmission of one or more Sounding Reference Signal (SRS) resources by the UE device.

Aspect 58: an apparatus for facilitating round trip time (RTT) positioning, the apparatus comprising: means for receiving capability information associated with a user equipment (UE) device; and means for transmitting a threshold associated with the UE device, wherein the threshold is based on the capability information.

Aspect 59: the method of aspect 58, further comprising: means for receiving a time-gap associated with the UE device, wherein the time-gap is associated with a transmission of one or more Sounding Reference Signal (SRS) resources by the UE device.

Aspect 60: a non-transitory computer-readable medium comprising at least one instruction for causing a computer or processor to perform operations according to any of any of aspects 1-30.

Aspect 61: a non-transitory computer-readable medium comprising at least one instruction for causing a computer or processor to perform operations according to any of any of aspects 31-53.

Aspect 62: a non-transitory computer-readable medium comprising at least one instruction for causing a computer or processor to perform operations according to any of any of aspects 54-59.

Aspect 63: a method for facilitating round trip time (RTT) positioning, the method comprising operations according to any combination of aspects 1-30, aspects 31-53, and aspects 54-59.

Aspect 64: an apparatus for facilitating round trip time (RTT) positioning, the apparatus comprising at least one transceiver, at least one memory, and at least one processor coupled to the at least one transceiver and the at least one memory and configured to perform operations according to any of any combination of aspects 1-30, aspects 31-53, and aspects 54-59.

Aspect 65: an apparatus for facilitating round trip time (RTT) positioning, the apparatus comprising means for performing operations according to any of any combination of aspects 1-30, aspects 31-53, and aspects 54-59.

Aspect 66: a non-transitory computer-readable medium comprising at least one instruction for causing a computer or processor to perform operations according to any combination of aspects 1-30, aspects 31-53, and aspects 54-59.

What is claimed is:

1. An apparatus for facilitating round trip time (RTT) positioning, the apparatus comprising:
   at least one transceiver;
   at least one memory; and
   at least one processor coupled to the at least one transceiver and the at least one memory and configured to:
      obtain a threshold associated with a user equipment (UE) device;
      determine, based on the threshold, resource configuration information for the UE device, the resource configuration information indicates a time-gap between Sounding Reference Signal (SRS) resources associated with the UE device, wherein the time-gap is configured to reduce round-trip-time (RTT) measurement error resulting from a clock drift associated with the UE device; and transmit, via the at least one transceiver, the resource configuration information to the UE device.

2. The apparatus of claim 1, wherein the at least one processor is further configured to:
transmit, via the at least one transceiver, the time-gap to a location server.

3. The apparatus of claim 1, wherein, to obtain the threshold, the at least one processor is configured to:
receive the threshold from a location server.

4. The apparatus of claim 1, wherein the resource configuration information further comprises signaling window information, the signaling window information specifying a signaling window for transmission of one or more SRS resources by the UE device.

5. The apparatus of claim 1, wherein the time-gap between the SRS resources is greater than or equal to the threshold.

6. The apparatus of claim 5, wherein the resource configuration information includes at least one Timing Advance (TA) command associated with the SRS resources, the at least one TA command being configured to cause the SRS resources to be transmitted by the UE device using a common TA.

7. The apparatus of claim 1, wherein the resource configuration information specifies at least a single SRS resource and a copy of the single SRS resource, the single SRS resource and the copy of the single SRS resource separated by the time-gap, or at least two SRS resources with an equal periodicity, or a combination thereof.

8. The apparatus of claim 1, wherein the threshold is based on a capability report of the UE device, a bandwidth of the UE device, a bandwidth of the SRS resources associated with the UE device, or a combination thereof.

9. The apparatus of claim 1, wherein the at least one processor is further configured to:
receive, via the at least one transceiver, at least one SRS resource from the UE device, wherein the at least one SRS resource is based on the time-gap indicated by the resource configuration information; and
transmit, via the at least one transceiver, at least one Positioning Reference Signal (PRS) resource to the UE device.

10. A computer-implemented method for facilitating round trip time (RTT) positioning, the method comprising:
obtaining a threshold associated with a user equipment (UE) device;
determining, based on the threshold, resource configuration information for the UE device, the resource configuration information indicating a time-gap between Sounding Reference Signal (SRS) resources associated with the UE device, wherein the time-gap is configured to reduce round-trip-time (RTT) measurement error resulting from a clock drift associated with the UE device; and
transmitting the resource configuration information to the UE device.

11. The computer-implemented method of claim 10, further comprising:
transmitting the time-gap to a location server.

12. The computer-implemented method of claim 11, wherein obtaining the threshold further comprises:
receiving the threshold from a location server.

13. The computer-implemented method of claim 10, wherein the resource configuration information further comprises signaling window information, the signaling window information specifying a signaling window for transmission of one or more SRS resources by the UE device.

14. The computer-implemented method of claim 11, wherein the time-gap between the SRS resources is greater than or equal to the threshold.

15. The computer-implemented method of claim 14, wherein the resource configuration information includes at least one Timing Advance (TA) command associated with the SRS resources, the at least one TA command being configured to cause the SRS resources to be transmitted by the UE device using a common TA.

16. The computer-implemented method of claim 10, wherein the resource configuration information specifies at least a single SRS resource and a copy of the single SRS resource, the single SRS resource and the copy of the single SRS resource separated by the time-gap, or at least two SRS resources with an equal periodicity, or a combination thereof.

17. The computer-implemented method of claim 10, wherein the threshold is based on a capability report of the UE device, a bandwidth of the UE device, a bandwidth of the SRS resources associated with the UE device, or a combination thereof.

18. The computer-implemented method of claim 10, further comprising:
receiving at least one SRS resource from the UE device, wherein the at least one SRS resource is based on the time-gap indicated by the resource configuration information; and
transmitting at least one Positioning Reference Signal (PRS) resource to the UE device.

19. An apparatus for facilitating round trip time (RTT) positioning, the apparatus comprising:
at least one transceiver;
at least one memory; and
at least one processor coupled to the at least one transceiver and the at least one memory and configured to:
receive, via the at least one transceiver, resource configuration information, wherein the resource configuration information is based on a threshold associated with the apparatus, and wherein the resource configuration information indicates a time-gap for transmission of Sounding Reference Signal (SRS) resources, wherein the time-gap is configured to reduce a clock drift associated with the apparatus; and
transmit, via the at least one transceiver, one or more SRS resources based on the time-gap indicated by the resource configuration information.

20. The apparatus of claim 19, wherein the time-gap for the SRS resources is greater than or equal to the threshold.

21. The apparatus of claim 19, wherein the resource configuration information specifies two SRS resources with an equal periodicity.

22. The apparatus of claim 19, wherein the resource configuration information specifies a single SRS resource and a copy of the single SRS resource, wherein the single SRS resource and the copy of the single SRS resource are separated by the time-gap.

23. The apparatus of claim 19, wherein the at least one processor is further configured to:
transmit, via the at least one transceiver, capability information to a location server.

24. The apparatus of claim 19, wherein the at least one processor is further configured to:

receive, via the at least one transceiver, at least one Positioning Reference Signal (PRS) resource.

25. A computer-implemented method for facilitating round trip time (RTT) positioning, the method comprising:
   receiving, by a user equipment (UE) device, resource configuration information, wherein the resource configuration information is based on a threshold associated with the UE device, and wherein the resource configuration information indicates a time-gap for transmission of Sounding Reference Signal (SRS) resources, wherein the time-gap is configured to reduce a clock drift associated with the apparatus; and
   transmitting, by the UE device, one or more SRS resources based on the time-gap indicated by the resource configuration information.

26. The computer-implemented method of claim 25, wherein the time-gap for the SRS resources is greater than or equal to the threshold.

27. The computer-implemented method of claim 25, wherein the one or more SRS resources are transmitted on a common Timing Advance (TA).

28. The computer-implemented method of claim 25, wherein the resource configuration information specifies two SRS resources with an equal periodicity.

29. The computer-implemented method of claim 25, wherein the resource configuration information specifies a single SRS resource and a copy of the single SRS resource, and wherein the single SRS resource and the copy of the single SRS resource are separated by the time-gap.

* * * * *